United States Patent
Icho et al.

(10) Patent No.: US 8,671,344 B2
(45) Date of Patent: Mar. 11, 2014

(54) INFORMATION DISPLAY DEVICE

(75) Inventors: Keiji Icho, Osaka (JP); Ryouichi Kawanishi, Kyoto (JP); Teruyuki Kimata, Tokyo (JP)

(73) Assignee: Panasonic Corporation, Osaka (JP)

( * ) Notice: Subject to any disclaimer, the term of this patent is extended or adjusted under 35 U.S.C. 154(b) by 427 days.

(21) Appl. No.: 12/936,014

(22) PCT Filed: Feb. 1, 2010

(86) PCT No.: PCT/JP2010/000567
§ 371 (c)(1),
(2), (4) Date: Dec. 10, 2010

(87) PCT Pub. No.: WO2010/087203
PCT Pub. Date: Aug. 5, 2010

(65) Prior Publication Data
US 2011/0154196 A1   Jun. 23, 2011

(30) Foreign Application Priority Data
Feb. 2, 2009   (JP) ................................ 2009-021165

(51) Int. Cl.
*G06F 3/01* (2006.01)
(52) U.S. Cl.
USPC ........................................................ 715/702
(58) Field of Classification Search
USPC ........................................................ 715/702
See application file for complete search history.

(56) References Cited

U.S. PATENT DOCUMENTS

| | | | |
|---|---|---|---|
| 6,937,254 B2 * | 8/2005 | Nishiyama et al. | 345/619 |
| 8,032,298 B2 * | 10/2011 | Han | 701/455 |
| 8,264,465 B2 * | 9/2012 | Grant et al. | 345/173 |
| 2004/0160416 A1 * | 8/2004 | Venolia | 345/157 |
| 2006/0192881 A1 | 8/2006 | Sato et al. | |
| 2006/0250419 A1 | 11/2006 | Shiba et al. | |
| 2007/0192744 A1 | 8/2007 | Reponen | |
| 2008/0062141 A1 | 3/2008 | Chandhri | |

FOREIGN PATENT DOCUMENTS

| | | |
|---|---|---|
| EP | 2 141 578 | 1/2010 |
| EP | 2 166 445 | 3/2010 |
| JP | 11-338628 | 12/1999 |

(Continued)

OTHER PUBLICATIONS

Grab and Drag add-on for Firefox, Nov. 4, 2008, http://web.archive.org/web/20081104084654/http://www.micropctalk.com/2008/02/24/grab-and-drag-add-on-for-firefox/, pp. 1-4.*

(Continued)

*Primary Examiner* — Stephen Hong
*Assistant Examiner* — James G Pohlman
(74) *Attorney, Agent, or Firm* — Wenderoth, Lind & Ponack, L.L.P.

(57) ABSTRACT

The present invention aims to provide an information display device for easily changing a scrolling speed and a display mode. The information display device receives an instruction for displaying a plurality of contents, via a move operation on a two-dimensional plane defined by first and second axes; determines a moving speed for moving the contents, based on a motion component of the move operation along the first axis, and determines a display mode for displaying the contents, based on a motion component of the move operation along the second axis; and displays the contents in the display mode on a screen, by scrolling through the contents at the moving speed.

13 Claims, 21 Drawing Sheets

(56) References Cited

FOREIGN PATENT DOCUMENTS

| JP | 2005-62043 | | 3/2005 |
|---|---|---|---|
| JP | 2005062043 | * | 3/2005 |
| JP | 2005-125877 | | 5/2005 |
| JP | 2006-268010 | | 10/2006 |
| JP | 2006-302196 | | 11/2006 |
| JP | 2008-269448 | | 11/2008 |
| JP | 2008269448 | * | 11/2008 |

OTHER PUBLICATIONS

International Search Report issued Mar. 9, 2010 in International (PCT) Application No. PCT/JP2010/000567.

Extended European Search Report mailed Oct. 29, 2013 in corresponding European Application No. 10735674.3.

Hurst, W. et al., "Interactive, Dynamic Video Browsing with the Zoomslider Interface", IEEE International Conference on Multimedia and EXPO, 2005. ICME 2005. Amsterdam, The Netherlands, Jul. 6, 2005, IEEE, pp. 558-561.

Anonymous: "Nokia Photo Browser-Beta Labs", Mar. 31, 2009, pp. 1-1, Retrieved from the Internet. URL:http//www.youtube.com/watch?v-pV18PH5LjT4.

Igarashi, T. et al., "Speed-Dependent Automatic Zooming for Browsing Large Documents", Proceeding of the 2000 ACM SIGCPR Conference. Chicago, IL, Apr. 6-8, 2000; [ACM Symposium on User Interface Software and Technology], New York, NY: ACM, US, Nov. 5, 2000, pp. 139-148.

* cited by examiner

| Input area pixel count | Scrolling speed | Size |
|---|---|---|
| 0 | 0 | 1 |
| 100 | 5 | 1/2 |
| 200 | 10 | 1/4 |
| 300 | 15 | 1/8 |
| . . . | . . . | . . . |

| Input area pixel count | Scrolling speed | Size | Display line count |
|---|---|---|---|
| 0 | 0 | 1 | 1 |
| 100 | 5 | 1 | 2 |
| 200 | 10 | 1 | 3 |
| 300 | 15 | 1 | 4 |
| ... | ... | ... | ... |

| Input area pixel count | Scrolling speed | Size | Display line count |
|---|---|---|---|
| 0 | 0 | 1 | 1 |
| 100 | 5 | 1/2 | 2 |
| 200 | 10 | 1/4 | 4 |
| 300 | 15 | 1/8 | 8 |
| ... | ... | ... | ... |

| X-axis items | | Y-axis items | |
|---|---|---|---|
| First input area pixel count | Scrolling speed | Second input area pixel count | Size |
| 0 | 0 | 0 | 1 |
| 100 | 5 | 100 | 1/2 |
| 200 | 10 | 200 | 1/4 |
| 300 | 15 | 300 | 1/8 |
| ... | ... | ... | ... |

INFORMATION DISPLAY DEVICE

TECHNICAL FIELD

The present invention relates to a device for displaying a plurality of images, and in particular to a technique for displaying the plurality of images by scrolling through the images.

BACKGROUND ART

In recent years, DSCs (Digital Still Cameras) for capturing subject images have been prevalent, and recording media that are either internal to or removable from the DSCs continue to increase in storage capacity. The increase in the storage capacity has enabled more images to be saved in the recording media which, however, makes it more difficult to find and view (hereinafter, "browse and search") a desired image from a large number of images.

A typical method in browsing and searching images is to sequentially display thumbnails of the images to enable search of a desired image. Specifically, for example, nine reduced images consisting of three vertical×three horizontal images are collectively displayed on one screen. Then, the reduced images are switched to another set of reduced images to be displayed on the screen with use of an operational button. This enables browsing and searching of a desired image.

Also, there is a display device and a display method with which a desired still image is efficiently searched for with use of operational keys from among images managed in groups (see Patent Literature 1). Since the images are managed in groups, and browsing and searching of a desired image is performed on a group-by-group basis, the number of images for browsing is reduced. This makes it possible to shorten the search time.

Another method is to provide two time lines each having different granularity (e.g., "month" and "day" dimensions) on one screen. First, a desired month is selected from the time line of "month". Then, only pictures in the selected month are displayed as thumbnails, nine at a time, on the time line of "day". In this way, still images that are stored in a memory and are captured each month are browsed at high speed with use of operational keys (see Patent Literature 2).

CITATION LIST

[Patent Literature 1]
  Japanese Patent Application Publication No. 2006-268010
[Patent Literature 2]
  Japanese Patent Application Publication No. 2006-302196

SUMMARY OF INVENTION

Technical Problem

To browse and search a plurality of images, the scrolling speed and the display mode for displaying the images (e.g., the size of the images, the number of display lines, etc.) are targeted to be controlled. The scrolling speed of the images indicates the display speed of the images when the images are continuously scrolled through from left to right or from top to bottom. For example, by lowering the scrolling speed, the user can take time to check the images. The display mode of the images indicates the size of images that are scrolled through for browsing and searching, the number of the images, the number of display lines, or the like. For example, by displaying many small images, the user can check more images at once from among the images that are scrolled through.

As described above, there are some methods for searching for an image stored on a recording medium with use of operational keys. However, according to these methods, images are scrolled through with a fixed size. Therefore, in a case where the fixed size of the images is small, the user may miss some display images that are scrolled through. For this reason, it is necessary to change the setting of the scrolling speed and the display size of images, the number of display lines, etc., in addition to the operation pertaining to the scrolling display. However, since these operations need to be performed separately from the operation pertaining to the scrolling display, the user finds it annoying to perform these operations.

The present invention has been achieved in view of the above problem, and an aim thereof is to provide an information display device, a display method, a computer program for display, and an integrated circuit for easily changing a scrolling speed and a display mode for displaying a plurality of images.

Solution to Problem

In order to achieve the above aim, the present invention provides an information display device comprising: a reception unit operable to receive an instruction for displaying a plurality of contents, via a move operation on a two-dimensional plane defined by first and second axes; a determination unit operable to determine a moving speed for moving the contents, based on a motion component of the move operation along the first axis, and to determine a display mode for displaying the contents, based on a motion component of the move operation along the second axis; and a display unit operable to display the contents in the display mode on a screen, by scrolling through the contents at the moving speed.

Advantageous Effects of Invention

According to the stated structure, when the user performs the move operation on the two-dimensional plane defined by the first and second axes, the information display device determines the moving speed from the motion component along the first axis, and determines the display mode for displaying the contents from the motion component along the second axis. As a result, the user can specify both the moving speed and the display mode in one operation, thus simplifying user operation.

Here, the determination unit may determine the moving speed such that the larger a motion component in a given direction along the first axis is, the faster the moving speed for scrolling through the contents is, and the display unit may display the contents by scrolling through the contents in a direction opposite from the given direction at the moving speed.

With the stated structure, the information display device determines the moving speed such that the larger the motion component in a given direction along the first axis is, the faster the scrolling speed is. Therefore, the user can easily specify a desired moving speed by simply adjusting the amount of movement along the first axis by the move operation.

Here, the contents may be images, the display mode may indicate a display size of the images, and the determination unit may determine the display size such that the larger a motion component in a given direction along the second axis is, the smaller the display size is.

With the stated structure, the information display device reduces the display size of the images such that the larger the motion component in a given direction along the second axis is, the smaller the display size is. Therefore, the user can easily specify a desired display size by simply adjusting the amount of movement along the second axis by the move operation.

Here, the determination unit may be further operable to calculate a corresponding speed that corresponds to the display size, by multiplying a moving speed before the move operation by a scale ratio of a length of a side of each image having the determined display size, the scale ratio being determined based on a display size before the move operation, and the display unit may display the images at a speed obtained by adding the corresponding speed to the moving speed before the move operation.

With the stated structure, the information display device takes into consideration the speed corresponding to the scale ratio of the display size, when displaying the images by scrolling through the images. In this way, even after specifying the display size by the move operation, the user can view the contents at a speed that does not appear to have changed from the speed before the move operation.

Here, the contents may be images, the display mode may indicate a number of lines of the images to be displayed in a direction orthogonal to a direction for scrolling through the images, and the determination unit may determine the number of lines such that the larger a motion component in a given direction along the second axis is, the larger the number of lines is.

With the stated structure, the information display device reduces the number of lines of the images to be displayed such that the larger the motion component in a given direction along the second axis is, the larger the number of lines is. Therefore, the user can easily specify a desired number of lines by simply adjusting the amount of movement along the direction of the second axis by the move operation.

Here, the screen may have a touch panel function, the move operation may be an operation performed by the user sliding a finger on the screen, the reception unit may be further operable to specify a starting position on the screen which the finger touches at a start of the move operation, and to specify the motion components along the first and the second axes by the move operation, and the display unit may be further operable to display a predetermined initial figure at the starting position, and subsequently display a figure corresponding to the motion components along the first and the second axes after changing the predetermined initial figure to the corresponding figure.

With the stated structure, the information display device has the touch panel function. Therefore, the user can easily specify the moving speed and the display mode by an operation on the touch panel. Also, the information display device displays the initial figure and the figure corresponding to the move operation. This enables the user to visualize the move operation that he/she has performed, the first motion component, and the second motion component.

Here, the reception unit may be further operable, after the sliding of the finger is performed on the screen, to receive a pressing operation in which pressing of the finger is continuous at an ending position of the sliding, the determination unit may be further operable to judge whether to maintain the moving speed and the display mode that have been determined, based on the pressing operation, and the display unit may be further operable to stop displaying the contents in the display mode by scrolling through the contents at the moving speed, when the determination unit judges that the moving speed and the display mode are not to be maintained.

With the stated structure, the information display device judges whether to maintain the moving speed and the display mode that have been determined, based on the pressing operation. Therefore, the user can easily specify whether to maintain the moving speed and the display mode by simply performing the pressing operation.

Here, the determination unit may judge that the moving speed and the display mode are to be maintained when judging that a pressing time period at the ending position of the sliding has exceeded a predetermined time period, and judge that the moving speed and the display mode are not to be maintained when judging that the pressing time period has not exceeded the predetermined time period.

With the stated structure, the information display device judges whether to maintain the moving speed and the display mode that have been determined, based on the pressing time period. Therefore, the user can easily specify whether to maintain the moving speed and the display mode without performing any special operations.

Here, the display unit may display the predetermined initial figure after changing the corresponding figure back to the predetermined initial figure, when the determination unit judges that the pressing time period has not exceeded the predetermined time period.

With the stated structure, when judging that the moving speed and the display mode that have been determined are not to be maintained, the information display device changes the displayed figure to the initial figure. This enables the user to visually check whether the moving speed and the display mode are maintained as a result of his/her move operation.

Here, the determination unit may be further operable to measure time in which the pressing operation at the ending position is being performed, and the display unit may be further operable, while the reception unit is receiving the pressing operation, to display at least one of the time that is being measured and a message indicating whether to maintain the moving speed and the display mode that have been determined by the determination unit.

With the stated structure, the information display device displays the time in which the pressing operation is being performed. This enables the user to easily check the timing of ending the pressing operation in accordance with his/her intention with the pressing operation (i.e., specification regarding whether to maintain the moving speed and the display mode).

Here, the display unit may be further operable, in a case where a next move operation is performed from a position of the screen that is currently touched by the finger, to display (i) information indicating that the moving speed has been changed in accordance with a direction of the finger sliding along the first axis and (ii) information indicating that the display mode has been changed in accordance with a direction of the finger sliding along the second axis.

With the stated structure, in the case where the next move operation is performed, the information display device displays the information indicating that the moving speed has been changed in accordance with the sliding direction along the first axis, and the information indicating that the display mode has been changed in accordance with the sliding direction along the second axis. This enables the user to visually check the move operation to be performed next so as to complete his/her intended operations.

Here, the screen may be divided into first and second display areas, the information display device may further comprise an acquisition unit operable to acquire display information sets pertaining to display of the contents, and the display unit may display the contents in the first display area, and the display information sets in the second display area.

With the stated structure, the information display device displays the display information sets pertaining to the contents to be displayed. This enables the user to view the display information sets together with the contents that are being displayed.

Here, the display information sets may be metadata sets, each set corresponding to and identifying a different one of the contents, and the display unit may display, in the second display area, one or more metadata sets corresponding to one or more contents that are being displayed in the first display area.

With the stated structure, the information display device displays the metadata sets as the display information sets. This enables the user to check details of the contents that are being displayed.

Here, the contents may be pictures, and each metadata set may indicate at least one of (i) a face of a person included in a corresponding picture and (ii) a color shade of a whole or part of the corresponding picture.

With the stated structure, the information display device displays, as each of the metadata sets, at least one of the face of a person included in the corresponding picture and the color shade of a whole or part of the corresponding picture. This enables the user to easily check the person included in the picture, and the color shade of the picture.

Here, the display information may indicate at least one of the moving speed and the display mode determined by the determination unit.

With the stated structure, the information display device displays, as the display information, at least one of the moving speed and the display mode. This enables the user to easily and visually check the specifications that he/she has given.

BRIEF DESCRIPTION OF DRAWINGS

FIG. 19 shows one example of a data structure of a view state conversion table T300.

FIG. 21 shows one example of a data structure of a view state conversion table T400.

DESCRIPTION OF EMBODIMENTS

1. Embodiment 1

The following describes an information display device 100 according to the present invention.

1.1 Structure of Information Display Device 100

The information display device 100 has a touch-panel equipped display 101 (hereinafter, "touch panel display"), and displays all contents stored therein by scrolling through the contents.

The present embodiment relates to operations pertaining to resizing of contents for a screen and controlling the moving speed (i.e., scrolling speed) of the contents, when the information display device 100 displays the contents stored therein by scrolling through the contents. Hereinafter, a scrolling display with respect to all contents stored in the information display device 100 is also referred to as "full-screen view". Also, the present embodiment is described with use of images as one example of contents.

Figure 1:
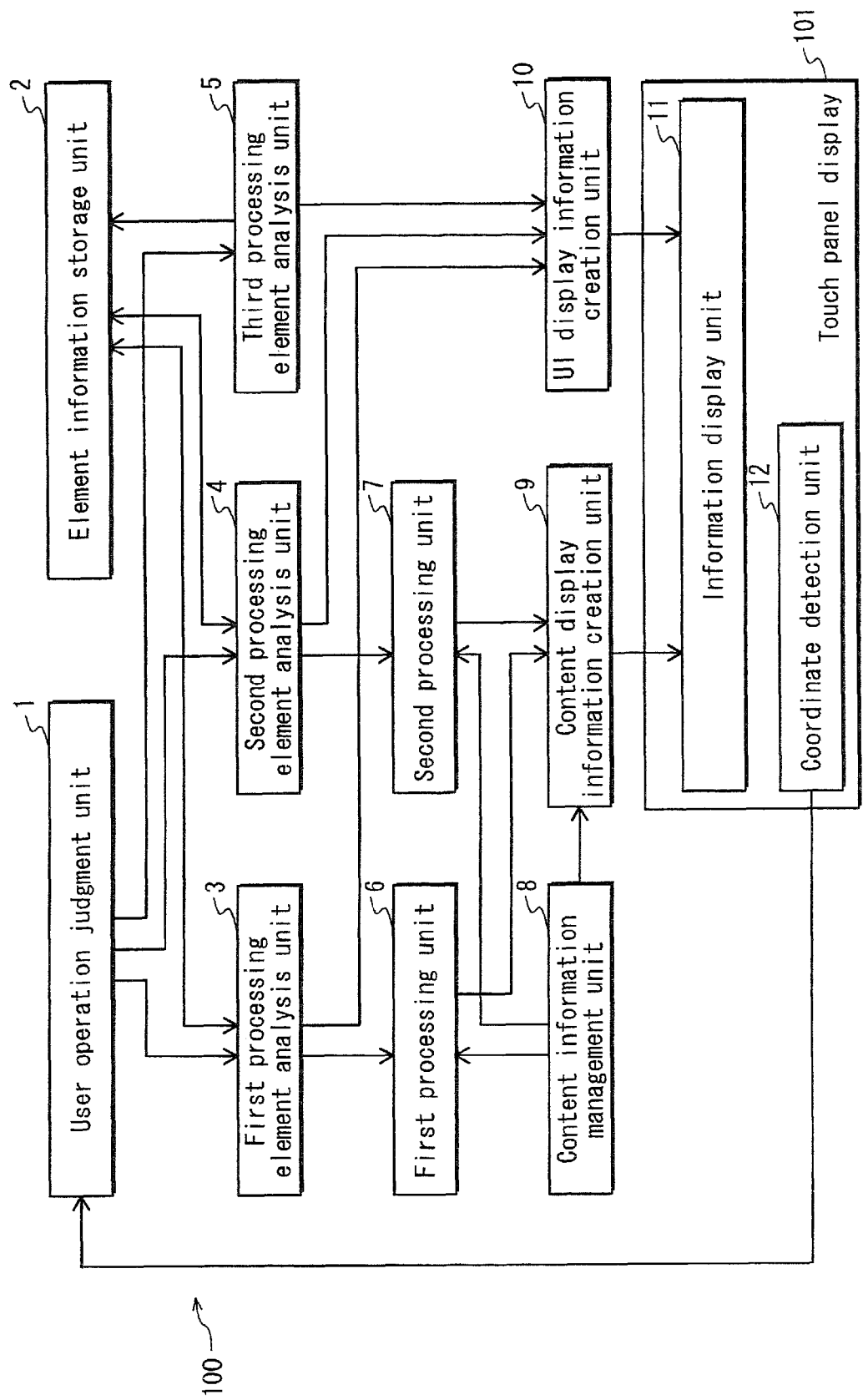
FIG. 1 is a block diagram showing a structure of an information display device 100.

As shown in FIG. 1, the information display device 100 includes a user operation judgment unit 1, an element information storage unit 2, a first processing element analysis unit 3, a second processing element analysis unit 4, a third processing element analysis unit 5, a first processing unit 6, a second processing unit 7, a content information management unit 8, a content display information creation unit 9, a UI (User Interface) display information creation unit 10, and a touch panel display 101. The touch panel display 101 includes an information display unit 11 and a coordinate detection unit 12.

(1) Touch Panel Display 101

The touch panel display 101 is a display equipped with a touch panel function, as described above.

Figures 2, 3:
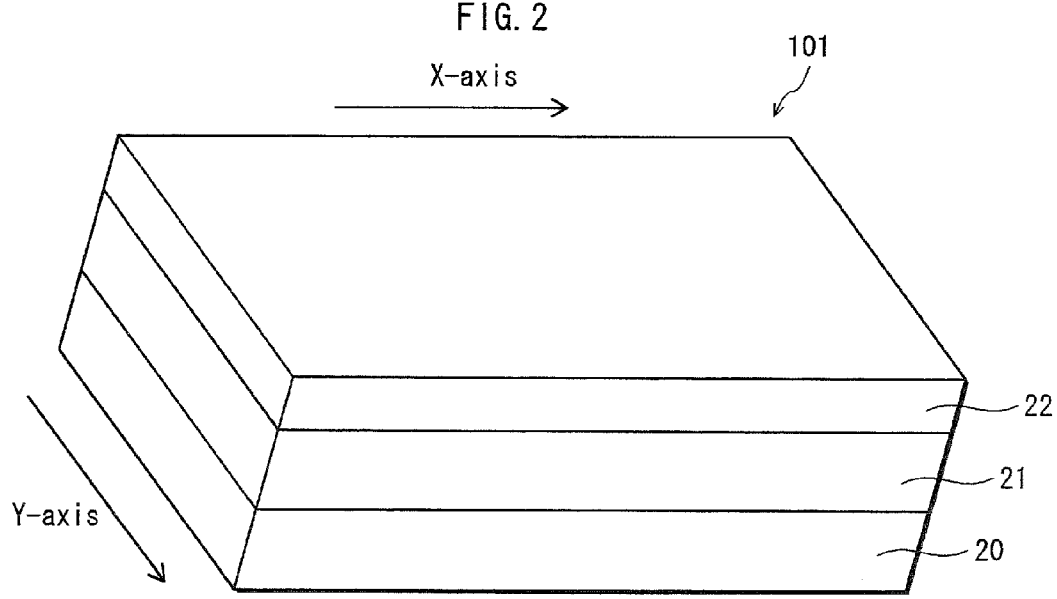
FIG. 2 shows a structure of a touch panel display 101.
FIG. 3 shows one example of a data structure of a view state conversion table T100.

The touch panel display 101 is, for example, a resistive touch panel display, and includes a display 20, a resistive coordinate detection device 21, and a protection insulation layer 22, as shown in FIG. 2.

Here, the display 20 corresponds to the functions of the information display unit 11 in FIG. 1, and the resistive coordinate detection device 21 corresponds to the functions of the coordinate detection unit 12.

The following describes the information display unit 11 and the coordinate detection unit 12.

The information display unit 11 displays information, based on information received from the content display information creation unit 9 and the UI display information creation unit 10. The functions of the content display information creation unit 9 and the functions of the UI display information creation unit 10 are described below.

The coordinate detection unit 12 detects pressing by a finger, and specifies the coordinates of the detected position (i.e., a point where the pressing is performed). The coordinate detection unit 12 outputs, to the user operation judgment unit 1, detection information indicating that pressing is detected, non-detection information indicating that pressing is not detected, and a coordinate position specified when pressing is detected.

(2) Content Information Management Unit 8

The content information management unit 8 manages (stores) a plurality of contents (images, in this example) and corresponding information (metadata) for each content, and responds to reference requests from the first processing unit 6, the second processing unit 7, and the content display information creation unit 9. Hereinafter, the contents and the pieces of corresponding information are also collectively referred to as "content information".

(3) User Operation Judgment Unit 1

The user operation judgment unit 1 judges the content (i.e., input information) of an operation performed on the information display device 100, based on a user operation using the touch panel display 101. Here, the input information is created by a user operation such as pressing, dragging, or releasing the touch panel display 101, and includes physical parameters such as operation start/end instructions, the moving distances of a coordinate position at which pressing on the display has been performed, each the moving distances being along the X-axis and along the Y-axis, respectively, and pressing duration.

Specifically, the user operation judgment unit 1 judges input information with use of the detection information, the non-detection information, and the coordinate position, which are output from the coordinate detection unit 12.

For example, the user operation judgment unit 1 judges that a user operation is started, upon receiving the detection information instead of the non-detection information. Also, the user operation judgment unit 1 judges that the user operation is ended, upon receiving the non-detection information instead of the detection information. In a case where a coordinate position is different each time the user operation judgment unit 1 receives the detection information, the user operation judgment unit 1 judges that a drag operation is being performed. In a case where received coordinate positions are the same, the user operation judgment unit 1 judges that pressing is performed at the same point (hereinafter, "fixed pressing).

The user operation judgment unit 1 continuously receives, from the coordinate detection unit 12, the detection information and coordinate positions that have been detected, during a time period from when pressing is detected to when pressing is not detected. Then, the user operation judgment unit 1 calculates first and second moving distances of a user operation, from a coordinate position at the start of the operation and a coordinate position currently received. Here, the first moving distance is along the X-axis (horizontal axis), and the second moving distance is along the Y-axis (vertical axis).

Also, the user operation judgment unit 1 measures operation duration in the following manner. When the coordinate detection unit 12 detects pressing, the user operation judgment unit 1 activates a timer (not shown) with the detection as a trigger. When the coordinate detection unit 12 detects that the force of the pressing is "0" (i.e., the pressing is released), the user operation judgment unit 1 deactivates the timer. Furthermore, the user operation judgment unit 1 measures motionless duration in which a motionless operation is being performed (i.e., duration of pressing at the same position). Here, the duration of the motionless operation is a time period from the end of a drag operation to the end of a pressing operation. While measuring the motionless duration, if a drag operation is started again without the pressing the pressing being released, the user operation judgment unit 1 resets the motionless duration to an initial value "0".

Upon calculating the first and second moving distances, the user operation judgment unit 1 outputs the first moving distance to the first processing element analysis unit 3, and the second moving distance to the second processing element analysis unit 4.

Upon measuring motionless duration or judging that a user operation is interrupted, the user operation judgment unit 1 outputs information indicating the motionless duration or the interruption to the third processing element analysis unit 5.

(4) Element Information Storage Unit 2

The element information storage unit 2 has a view state conversion table T100. The view state conversion table T100 is used for the first processing element analysis unit 3 and the second processing element analysis unit 4 to specify the view states of images based on a user operation.

The view state conversion table T100 shows scrolling speeds and sizes when images are displayed. Each of the scrolling speeds and the sizes corresponds to lengths (i.e., a moving distance along the X-axis and a moving distance along the Y-axis) of a calculated input area. As shown in FIG. 3, the view state conversion table T100 has an area for storing a plurality of groups that each consist of an input area pixel count, a scrolling speed, and a size.

Each input area pixel count indicates the number of pixels included in the range of the moving distances along the X-axis and the Y-axis. Each scroll speed is a moving speed when images to be displayed are scrolled. Each size indicates a reduction ratio for the vertical and horizontal lengths of the images to be displayed. The reduction ratio is based on a size when one image is displayed on a screen.

Upon receiving a request for storing element information from the third processing element analysis unit 5, the element information storage unit 2 acquires pieces of parameter information pertaining to the current view states of images, from the other processing element analysis units (i.e., the first processing element analysis unit 3 and the second processing element analysis unit 4), and temporarily stores the pieces of parameter information.

Upon receiving a request for outputting element information from the third processing element analysis unit 5, the element information storage unit 2 outputs the pieces of parameter information pertaining to the view states of the images temporarily stored therein, to the other processing element analysis units (i.e., the first processing element analysis unit 3 and the second processing element analysis unit 4).

(5) First Processing Element Analysis Unit 3

The first processing element analysis unit 3 acquires a physical parameter (i.e., first moving distance) from the user operation judgment unit 1. The first processing element analysis unit 3 determines first parameter information pertaining to a view state (i.e., scrolling speed) corresponding to the first moving distance, with use of the view state conversion table T100. Here, in a case where the value of the first moving distance is in the range between one input area pixel count and another input area pixel count, the first processing element analysis unit 3 determines the first parameter information to be the minimum value within the range. For example, if the value of the first moving distance is 130, the first processing element analysis unit 3 determines the first parameter information to be the scrolling speed "5" that corresponds to the input area pixel count "100", with use of the view state conversion table T100.

The first processing element analysis unit 3 transmits, to the first processing unit 6, an instruction for processing pertaining to changing of a scrolling speed. Also, the first processing element analysis unit 3 transmits, to the UI display information creation unit 10, a first notification indicating a UI display pertaining to a change in speed. The first notification is, for example, the first moving distance received from the user operation judgment unit 1.

Upon receiving a request for element information, the first processing element analysis unit 3 transmits the first parameter information currently stored therein to the element information storage unit 2. When the element information is output from the element information storage unit 2, the first processing element analysis unit 3 acquires the first parameter information stored in the element information storage unit 2, and transmits an instruction for processing pertaining to a scrolling speed to the first processing unit 6 based on the first parameter information.

(6) Second Processing Element Analysis Unit 4

The second processing element analysis unit 4 acquires a physical parameter (i.e., second moving distance) from the user operation judgment unit 1. The second processing element analysis unit 4 determines second parameter information pertaining to a view state (i.e., size) corresponding to the second moving distance, with use of the view state conversion table T100. Here, in a case where the value of the second moving distance is in the range between one input area pixel count and another input area pixel count, the second processing element analysis unit 4 determines the second parameter information to be the minimum value within the range. For example, if the value of the second moving distance is 120, the second processing element analysis unit 4 determines the second parameter information to be the size "½" that corresponds to the input area pixel count "100".

The second processing element analysis unit 4 transmits, to the second processing unit 7, an instruction for processing pertaining to changing of the size of images. Also, the second processing element analysis unit 4 transmits, to the UI display information creation unit 10, a second notification indicating a UI display pertaining to resizing for displaying the images. The second notification is, for example, the second moving distance received from the user operation judgment unit 1.

Upon receiving a request for element information from the element information storage unit 2, the second processing element analysis unit 4 transmits the second parameter information currently stored therein to the element information storage unit 2.

When the element information is output from the element information storage unit 2, the second processing element analysis unit 4 acquires the second parameter information stored in the element information storage unit 2, and transmits an instruction for processing pertaining to a change in the size of the images to the second processing unit 7 based on the second parameter information.

(7) Third Processing Element Analysis Unit 5

The third processing element analysis unit 5 acquires, from the user operation judgment unit 1, information that is included in the input information and that is other than first moving information and the second moving information. In the case of judging that the element information is to be stored based on the information acquired from the user operation judgment unit 1, the third processing element analysis unit 5 transmits, to the element information storage unit 2, a notification indicating that the element information is to be stored. A criterion of this judgment is that a user operation is being interrupted or that a certain physical parameter (e.g., motionless duration) during the interruption of the user operation is larger than a predetermined value. In a case where the criterion of the judgment is the latter one, the third processing element analysis unit 5 transmits information indicating the physical parameter or information indicating that the physical parameter has exceeded the predetermined value.

Also, in the case of judging that the element information is to be output based on the information acquired from the user operation judgment unit 1, the third processing element analysis unit 5 transmits, to the element information storage unit 2, a notification indicating that the element information is to be output. A criterion of this judgment is information indicating resumption of a user operation.

(8) First Processing Unit 6

Upon receiving an instruction for processing from the first processing element analysis unit 3, the first processing unit 6 acquires related information from the content information management unit 8. Then, based on the related information, the first processing unit 6 performs processing for changing the related information into a view state (i.e., scrolling speed) with use of a conversion table or a conversion expression, and transmits information for displaying contents to the content display information creation unit 9.

Specifically, upon receiving the first parameter information from the first processing element analysis unit 3, the first processing unit 6 acquires information such as the size capacity of images to be displayed. The first processing unit 6 determines a buffer capacity to be ensured and a time interval at which the images to be displayed are read, based on the acquired size capacity and the scrolling speed indicated by the first parameter information. Then, the first processing unit 6 transmits information indicating the buffer capacity and the time interval to the content display information creation unit 9.

(9) Second Processing Unit 7

Upon receiving an instruction for processing from the second processing element analysis unit 4, the second processing unit 7 acquires related information from the content information management unit 8. Then, the second processing unit 7 performs processing for changing responsible view states (e.g., the display size, the number of images to be displayed, etc.) based on the related information, and transmits information pertaining to display of contents to the content display information creation unit 9.

Specifically, upon receiving the second parameter information from the second processing element analysis unit 4, the second processing unit 7 acquires the size capacity of images to be displayed. Based on the size capacity and the value indicated by the second parameter information, the second processing unit 7 determines the display size of images to be displayed and the number of images to be displayed on one screen, and transmits information indicating the display size and the number of images to the content display information creation unit 9.

(10) Content Display Information Creation Unit 9

The content display information creation unit 9 creates information for displaying contents, and transmits the information to the information display unit 11. Here, the information is created based on the information pertaining to display of contents transmitted from the first processing unit 6 and the second processing unit 7, and the content information acquired from the content information management unit 8.

Specifically, upon receiving, from the first processing unit 6, the buffer capacity to be ensured and the time interval at which the images to be displayed are read, the content display information creation unit 9 ensures the buffer capacity, sequentially reads the images to be displayed at the time interval, and stores the images into the buffer. Then, the content display information creation unit 9 creates information to be displayed on one screen, based on the display size of the images to be displayed and the number of images to be displayed on one screen that are received from the second processing unit 7.

(11) UI Display Information Creation Unit 10

The UI display information creation unit 10 creates information for displaying a UI and transmits the information to the information display unit 11. Here, the information is created based on information pieces pertaining to display of the UI that are received from the first processing element analysis unit 3, the second processing element analysis unit 4, and the third processing element analysis unit 5.

Specifically, the UI display information creation unit 10 creates a rectangular image whose starting point is a coordinate position detected at the start of an operation. One side of the rectangular image is along the X-axis, and represents the first moving distance indicated by the first notification received from the first processing element analysis unit 3. Another side of the rectangular image is along the Y-axis, and represents the second moving distance indicated by the second notification received from the second processing element analysis unit 4. Upon creating the rectangular image, the UI display information creation unit 10 transmits the rectangular image to the information display unit 11. Here, the corners of the rectangular image may be round.

When the start of an operation is detected, the UI display information creation unit 10 creates an initial figure and transmits the initial figure to the information display unit 11. The initial figure is, for example, a circle that surrounds a position at which pressing has been performed.

Also, upon receiving, from the third processing element analysis unit 5, information indicating that the size of the physical parameter has exceeded the predetermined value, the UI display information creation unit 10 creates a message indicating the information, and transmits the message to the information display unit 11.

1.2 Overview of Touch Panel Operations

The following describes processing for changing a scrolling speed when displaying a plurality of images, and processing for changing a display mode.

Figure 4:
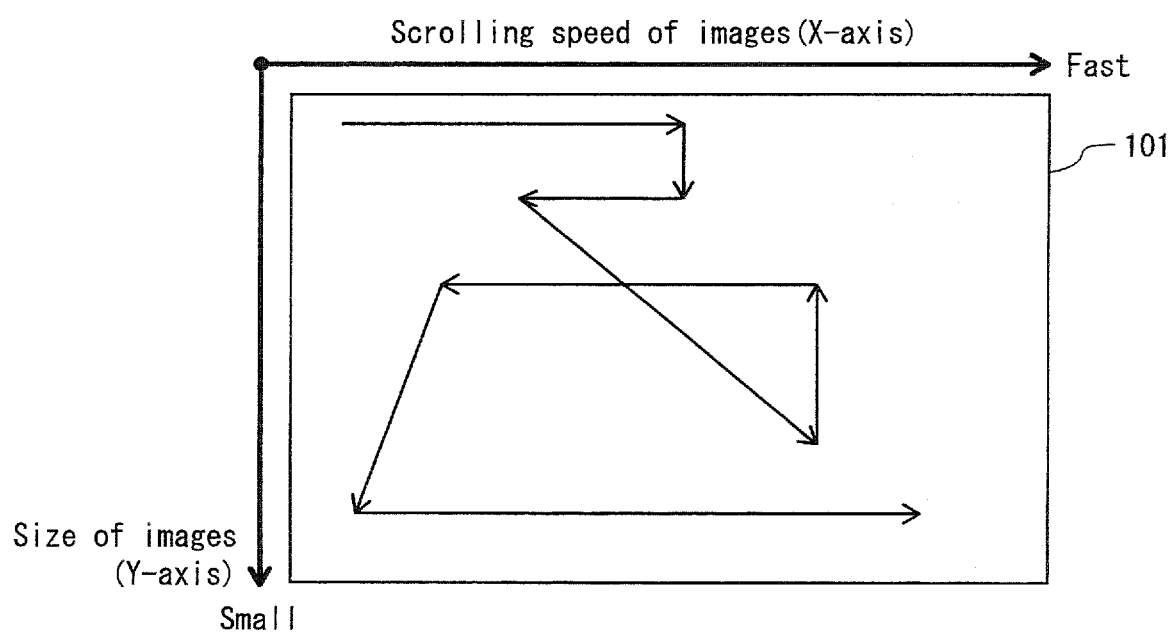
FIG. 4 is a schematic diagram pertaining to operations for changing a scrolling speed and a display mode.

FIG. 4 is a schematic diagram pertaining to operations in changing a scrolling speed and a display mode when displaying a plurality of images. Here, an operation of the touch panel display 101 in a horizontal (X-axis) direction enables changing the scrolling speed of a plurality of images, and an operation of the touch panel display 101 in a vertical (Y-axis) direction enables changing the display mode (the size) of the images. Furthermore, an operation of the touch panel display 101 in a diagonal direction enables changing both the scrolling speed and the display mode (the size) of the images at the same time, by dividing the operation amount in the vertical direction and the horizontal direction. This realizes a UI for operating freely on a two-dimensional plane, thus enabling a user to perform more intuitive operations.

1.3 Operations

Figure 5:
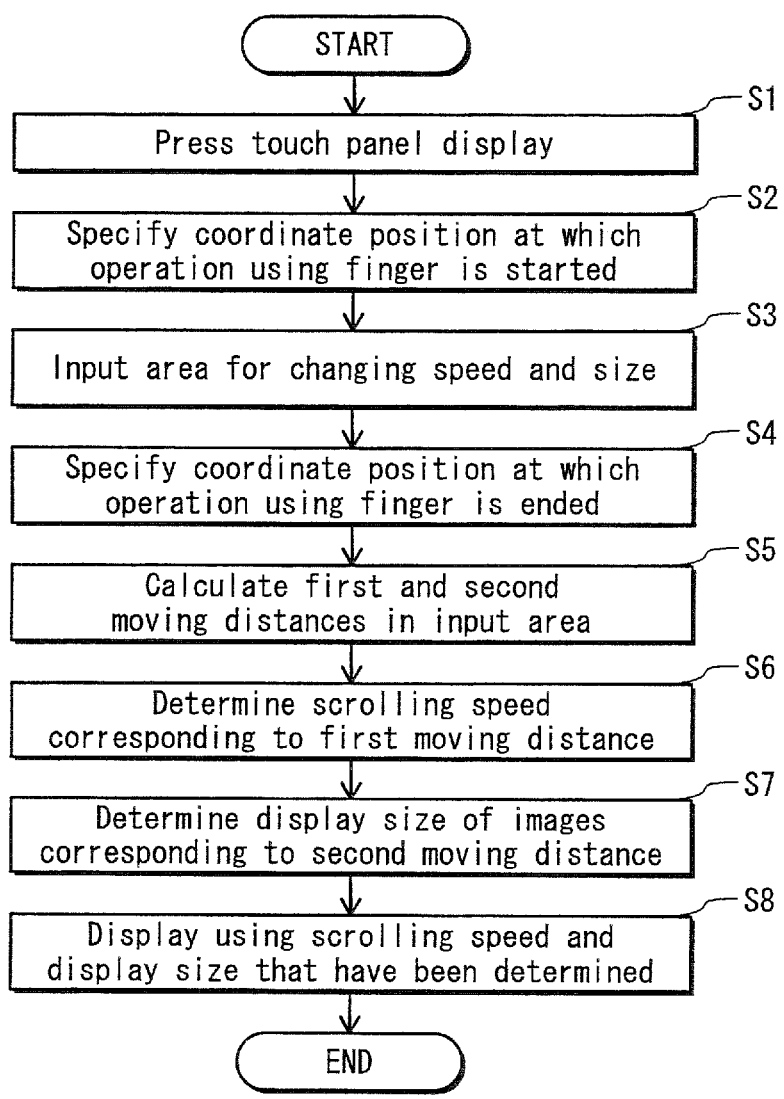
FIG. 5 is a flowchart showing an operation of the information display device 100 according to Embodiment 1.

FIG. 5 is a flowchart showing an operation of the information display device 100 when displaying a plurality of images. In particular, the flowchart shows processing for changing a scrolling speed and a display size by a user operation using the touch panel display 101.

The coordinate detection unit 12 detects the start of an operation when the touch panel display 101 is pressed by a user (step S1).

The coordinate detection unit 12 specifies a coordinate position at which the operation using a finger is started, and outputs, to the user operation judgment unit 1, information indicating that the start of the operation has been detected and the specified coordinate position (step S2). Upon receiving the information and the coordinate position, the user operation judgment unit 1 judges that a user operation is started.

The coordinate detection unit 12 receives an input of an area for changing, at the same time, a scrolling speed and an image size that is a display state (step S3). This input is performed, for example, by specifying the input area by a drag operation using a finger with the touch panel display being pressed.

The coordinate detection unit 12 specifies a coordinate position at which the operation is ended by an operation for releasing the touch display panel from being pressed (step S4).

The user operation judgment unit 1 calculates a length (i.e., first moving distance) of the input area in the horizontal direction, and a length (i.e., second moving distance) of the input area in the vertical direction, based on the specified coordinate positions, namely the coordinate position at which the operation is started and the coordinate position at which the operation is ended (step S5).

The first processing element analysis unit 3 determines a scrolling speed corresponding to the calculated first moving distance (step S6).

The second processing element analysis unit 4 determines the size of images corresponding to the calculated second moving distance (step S7).

The information display unit 11 displays a plurality of images based on the scrolling speed and the size of images that have been determined in steps S6 and S7 (step S8).

1.4 Specific Examples of Changing Scrolling Speed and Display Size

Figure 6:
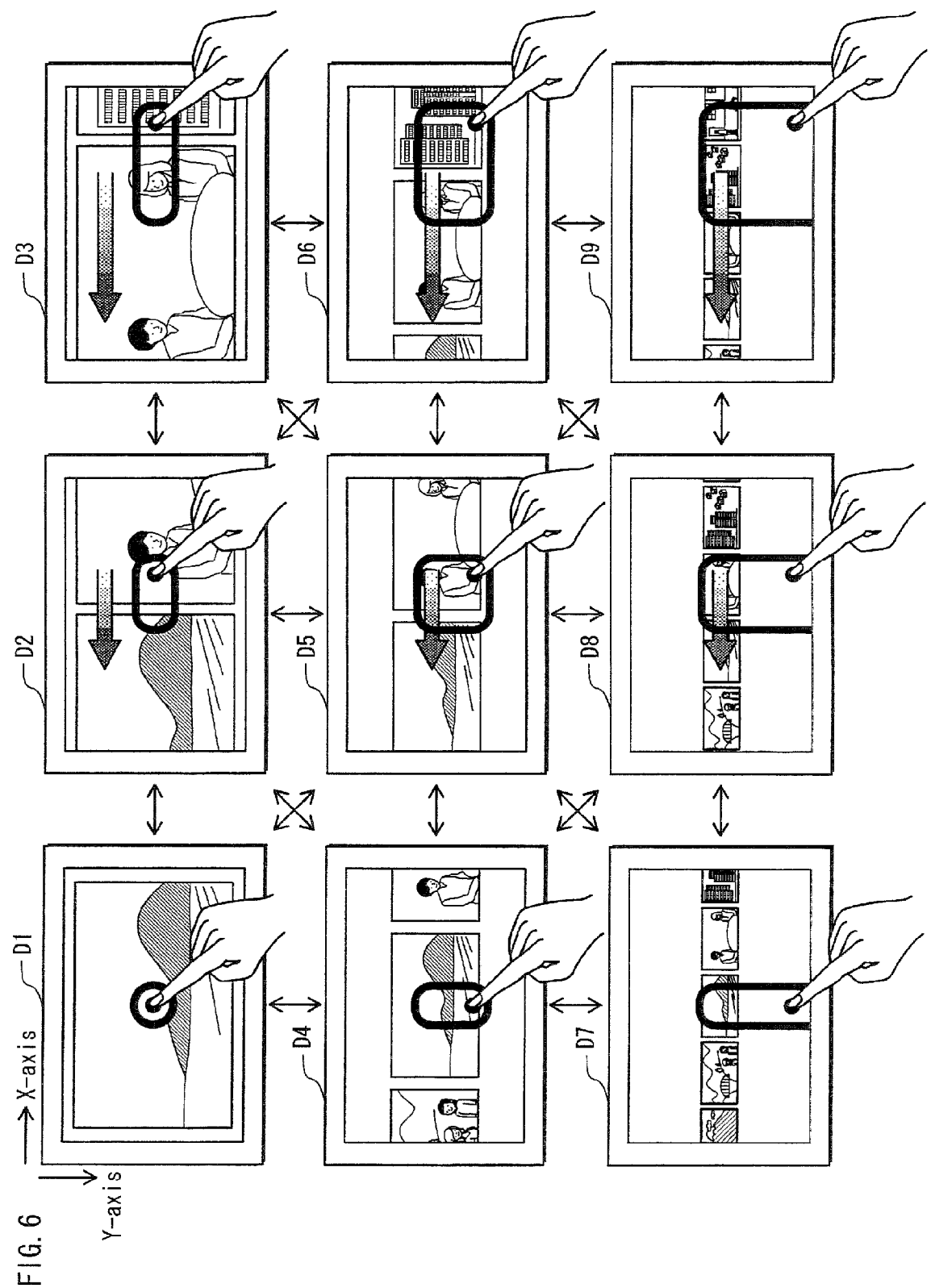
FIG. 6 shows a specific example of changing a scrolling speed and a display size when displaying a plurality of images.

FIG. 6 shows an example of changing a scrolling speed and a display size when displaying a plurality of images. A screen D1 is a screen at the start of an operation. As described above, the initial figure is displayed at the start of the operation. The user can perform a drag operation so as to change the display state in the screen D1 to each of the scrolling states from screens D2 to D9.

As shown by the transitions from the screen D1 to the screens D2 and D3, from the screen D4 to the screens D5 and D6, and from the screen D7 to the screens D8 and D9, the longer the length (i.e., first moving distance) along the horizontal axis is in the drag operation by the user, the higher the scrolling speed is.

Also, as shown by the transitions from the screen D1 to the screens D4 and D7, from the screen D2 to the screens D5 and D8, and from the screen D3 to the screens D6 to D9, the longer the length (i.e., second moving distance) along the vertical axis is in the drag operation by the user, the smaller the display size is.

Furthermore, when the user performs a drag operation in a diagonal direction, as shown by the transitions from the screen D1 to the screens D5 and D9 and from the screen D3 to the screens D5 and D7, the length in the horizontal direction and the length in the vertical direction are each calculated separately as a coordinate component along a different axis. This makes it possible to change both the scrolling speed and the display size at the same time.

2. Embodiment 2

The following describes Embodiment 2 pertaining to the present invention, with reference to the drawings. Embodiment 2 relates to an operation for scrolling through a list (hereinafter, "stream view") of a search result and an operation for changing stream lines.

Note that in Embodiment 2, the same reference signs are given to components having the same functions as Embodiment 1, and descriptions thereof are omitted since descriptions in Embodiment 1 are applicable thereto. Also, unless otherwise described, the structure of Embodiment 2 is the same as that of Embodiment 1, including the fundamental structure of the information display device.

Embodiment 2 is different from Embodiment 1 with respect to an element information storage unit, a second processing element analysis unit, and a second processing unit (hereinafter, these units are provided with reference signs 2a, 4a, and 7a for convenience), whose functions are different from those of the element information storage unit 2, the second processing element analysis unit 4, and the second processing unit 7.

The following describes a structure different from Embodiment 1.

2.1 Structure (1) Element Information Storage Unit 2a

The element information storage unit 2a has a view state conversion table T200. The view state conversion table T200 is used for the first processing element analysis unit 3 and the second processing element analysis unit 4a to specify the view states of images based on a user operation.

Figures 7, 8:
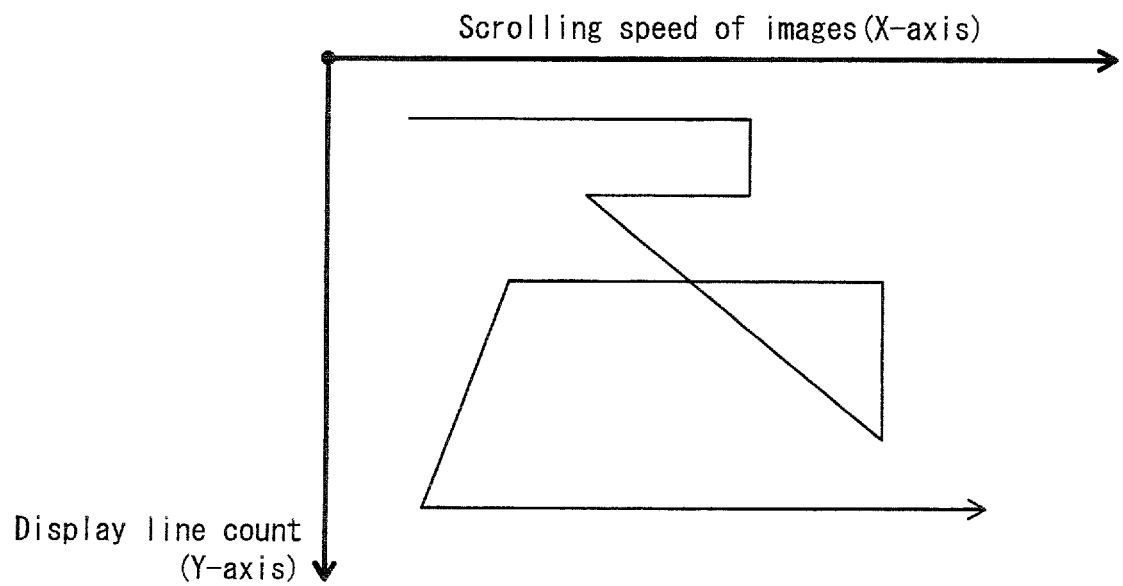
FIG. 7 shows one example of a data structure of a view state conversion table T200.
FIG. 8 is a schematic diagram pertaining to operations for changing a scrolling speed and a display mode.

The view state conversion table T200 shows scrolling speeds, sizes, and display line counts when images are displayed. Each of the scrolling speeds, the sizes, and the display line counts corresponds to lengths (i.e., a moving distance along the X-axis and a moving distance along the Y-axis) of a calculated input area. As shown in FIG. 7, the view state conversion table T200 has an area for storing a plurality of groups that each consist of an input area pixel count, a scrolling speed, a size, and a display line count.

The input area pixel counts and the sizes are the same as those in the view state conversion table T100 in Embodiment 1. Therefore, descriptions thereof are omitted here.

Each display line count indicates the number of lines when images are displayed.

Upon receiving, from the third processing element analysis unit 5, either a request for storing element information or a request for outputting element information, the element information storage unit 2a performs the same processing as the element information storage unit 2 according to Embodiment 1. Therefore, descriptions of the processing of the element information storage unit 2a are omitted here.

(2) Second Processing Element Analysis Unit 4a

The second processing element analysis unit 4a acquires a physical parameter (i.e., second moving distance) from the user operation judgment unit 1. The second processing element analysis unit 4a determines second parameter information pertaining to view states (i.e., size and display line count) corresponding to the second moving distance, with use of the view state conversion table T200. Here, in a case where the value of the second moving distance is in the range between one input area pixel count and another input area pixel count, the second processing element analysis unit 4a determines the second parameter information to be the minimum value within the range. For example, if the value of the second moving distance is 120, the second processing element analysis unit 4a determines the second parameter information to be the size "1" and the display line count "2" that correspond to the input area pixel count "100".

The second processing element analysis unit 4a transmits, to the second processing unit 7a, an instruction for processing pertaining to changing of the size of images. Also, the second processing element analysis unit 4a transmits, to the UI display information creation unit 10, a second notification indicating a UI display pertaining to resizing for displaying the images. The second notification is, for example, the second moving distance received from the user operation judgment unit 1, in the same manner as Embodiment 1.

Upon receiving a request for element information from the element information storage unit 2, or when the element information is output from the element information storage unit 2, the second processing element analysis unit 4a performs the same processing as the second processing element analysis unit 4 according to Embodiment 1. Therefore, descriptions of the processing of the second processing element analysis unit 4a are omitted here.

(3) Second Processing Unit 7a

Upon receiving an instruction for processing from the second processing element analysis unit 4a, the second processing unit 7a acquires related information from the content information management unit 8. Then, the second processing unit 7a performs processing for changing responsible view states (e.g., the display size, the number of images to be displayed, the display line count, etc.) based on the related information, and transmits information pertaining to display of contents to the content display information creation unit 9.

Specifically, upon receiving the second parameter information from the second processing element analysis unit 4a, the second processing unit 7a acquires the size capacity of images to be displayed. Based on the size capacity and the values (the size and the display line count) indicated by the second parameter information, the second processing unit 7a determines the display size of images to be displayed, the number of images to be displayed on one screen, and the order in which the images are displayed based on the display line count, and transmits information indicating the display size, the number of images, and the display order to the content display information creation unit 9.

2.2 Overview of Touch Panel Operations

The following describes processing for changing a scrolling speed when displaying a plurality of images, and processing for changing a display mode.

FIG. 8 is a schematic diagram pertaining to operations for changing a scrolling speed and a display mode when displaying a plurality of images. Here, an operation of the touch panel display 101 in a horizontal (X-axis) direction enables changing the scrolling speed of a plurality of images, and an operation of the touch panel display 101 in a vertical (Y-axis) direction enables changing the display mode (the display line count) of the images. Furthermore, an operation of the touch panel display 101 in a diagonal direction enables changing both the scrolling speed and the display mode (the display line count) of the images at the same time, by dividing the operation amount in the vertical direction and the horizontal direction. This realizes a UI for operating freely on a two-dimensional plane, thus enabling a user to perform more intuitive operations.

2.3 Operations

Figure 9:
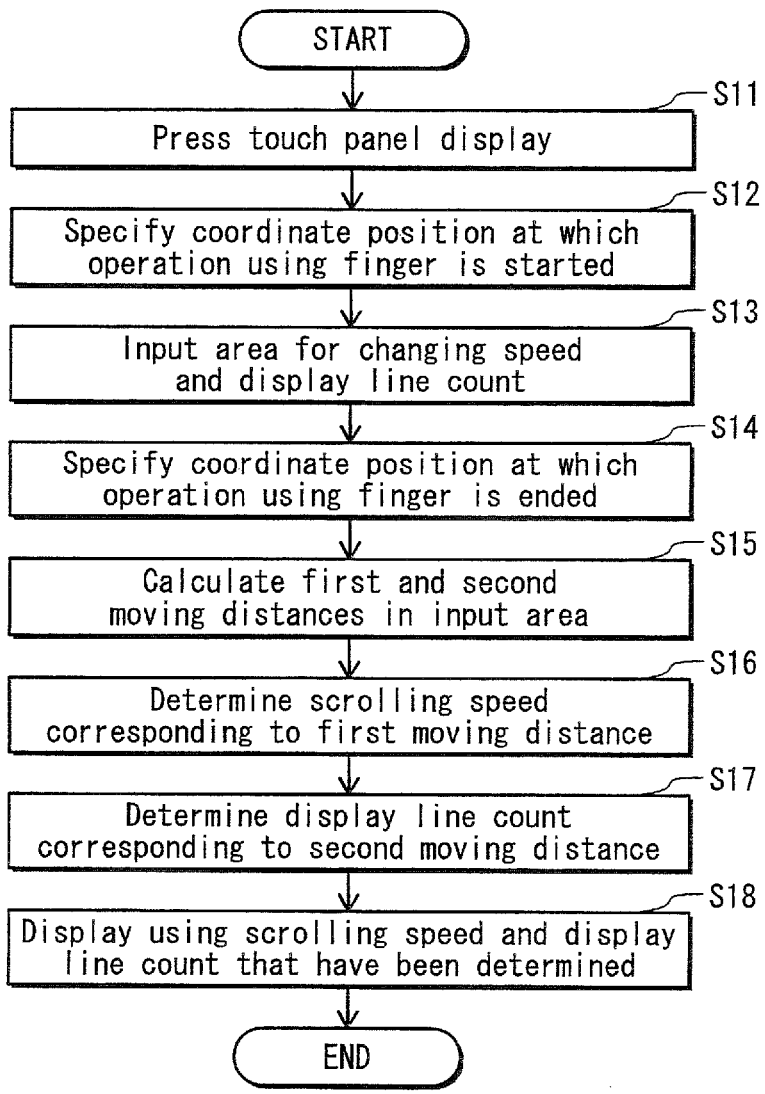
FIG. 9 is a flowchart showing an operation of the information display device 100 according to Embodiment 2.

FIG. 9 is a flowchart showing an operation of the information display device 100 when displaying a plurality of images. In particular, the flowchart shows processing for changing a scrolling speed and a display mode by a user operation using the touch panel display 101.

The coordinate detection unit 12 detects the start of an operation when the touch panel display 101 is pressed by a user (step S11).

The coordinate detection unit 12 specifies a coordinate position at which the operation using a finger is started, and outputs, to the user operation judgment unit 1, information indicating that the start of the operation has been detected and the specified coordinate position (step S12). Upon receiving the information and the coordinate position, the user operation judgment unit 1 judges that a user operation is started.

The coordinate detection unit 12 receives an input of an area for changing, at the same time, a scrolling speed and a display line that is a display state (step S13). This input is performed, for example, by specifying the input area by a drag operation using a finger with the touch panel display being pressed.

The coordinate detection unit 12 specifies a coordinate position at which the operation is ended by an operation for releasing the touch display panel from being pressed (step S14).

The user operation judgment unit 1 calculates a length (i.e., first moving distance) of the input area in the horizontal direction, and a length (i.e., second moving distance) of the input area in the vertical direction, based on the specified coordinate positions, namely the coordinate position at which the operation is started and the coordinate position at which the operation is ended (step S15).

The first processing element analysis unit 3 determines a scrolling speed corresponding to the calculated first moving distance (step S16).

The second processing element analysis unit 4a determines a display line count corresponding to the calculated second moving distance (step S17).

The information display unit 11 displays a plurality of images based on the scrolling speed and the display line count that have been determined in steps S16 and S17 (step S18).

2.4 Specific Examples of Changing Scrolling Speed and Display Line Count

Figure 10:
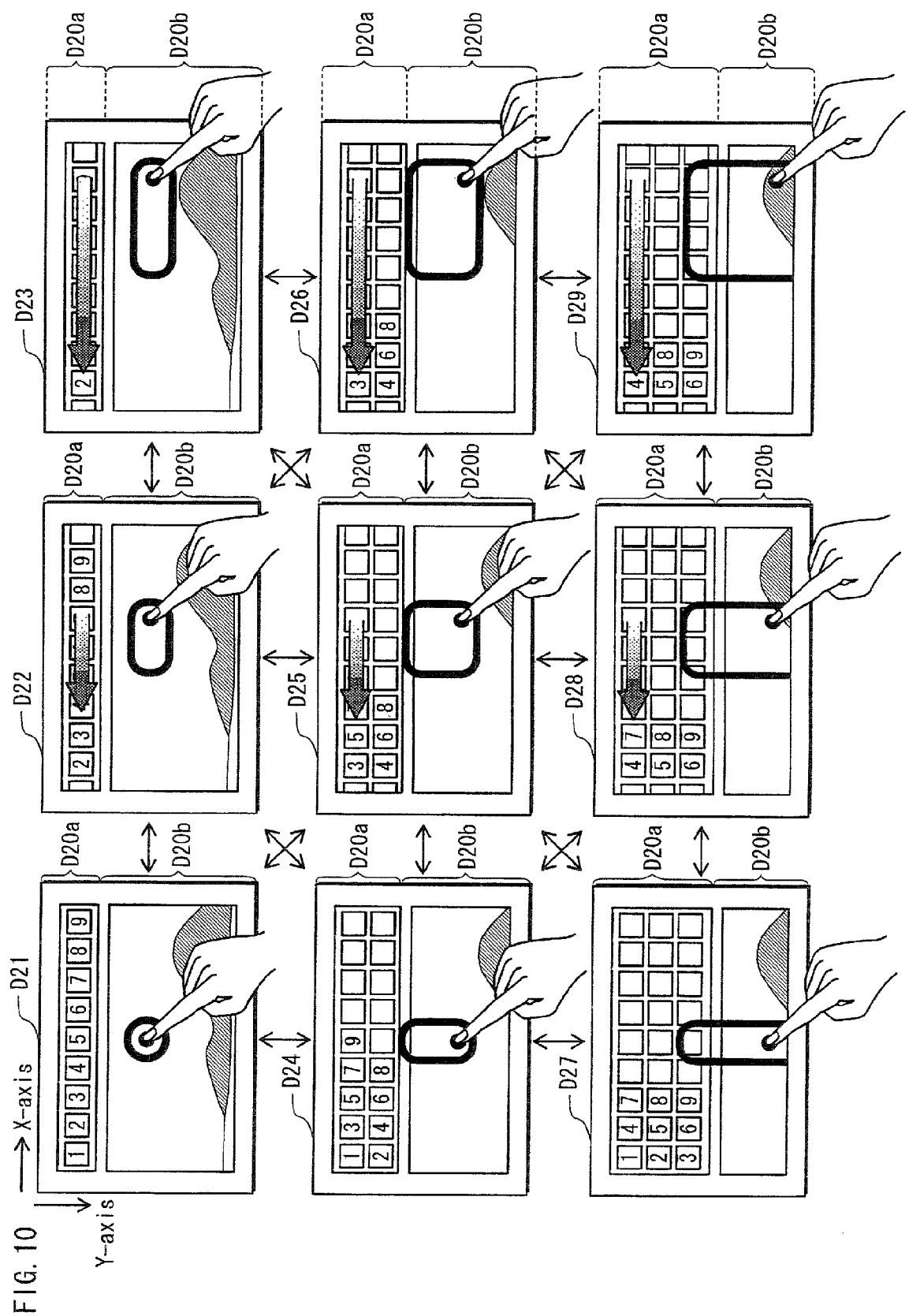
FIG. 10 shows a specific example of changing a scrolling speed and a display line count when displaying a plurality of images by a stream view.

FIG. 10 shows an example of changing a scrolling speed and a display line count by a user operation, when displaying a plurality of images using a stream view.

When images are displayed using a stream view, the screen is divided into two areas, i.e., an image display area D20a and a search display area D20b. The search display area D20b is an area for displaying a screen for inputting search conditions, or the like. The image display area D20a is an area for displaying one or more images that match the search conditions. In FIG. 10, the image display area D20a includes rectangles which indicate images that have been searched. The numbers in the rectangles indicate the order in which the images have been read by the content information management unit 8.

A screen D21 is a screen at the start of an operation. In the same manner as Embodiment 1, the initial figure is displayed at the start of the operation. The user can perform a drag operation so as to change the display state in the screen D21 to each of the scrolling states from screens D22 to D29.

As shown by the transitions from the screen D21 to the screens D24 and D27, from the screen D22 to the screens D25 and D28, and from the screen D23 to the screens D26 to D29, the longer the length (i.e., second moving distance) along the vertical direction is in the drag operation by the user, the higher the display line count is. Furthermore, when the user performs a drag operation in a diagonal direction, as shown by the transitions from the screen D21 to the screens D25 and D29 and from the screen D23 to the screens D25 and D27, the length in the horizontal direction and the length in the vertical direction are each calculated separately as a coordinate component along a different axis. This makes it possible to change both the scrolling speed and display line count of images at the same time. Also, it can be seen from FIG. 10 that, the higher the display line count is, the larger the area of the image display area D20a is but the smaller the area of the search display area D20b is.

3. Embodiment 3

The following describes Embodiment 3 pertaining to the present invention, with reference to the drawings. Embodiment 3 relates to a mechanism for reflecting a user's intention with respect to a scrolling state (the scrolling speed and size of images in the present embodiment).

Note that in Embodiment 3, the same reference signs are given to components having the same functions as Embodiment 1, and descriptions thereof are omitted since descriptions in Embodiment 1 are applicable thereto. Also, unless otherwise described, the structure of Embodiment 3 is the same as that of Embodiment 1, including the fundamental structure of the information display device.

Embodiment 3 is different from Embodiment 1 with respect to a first processing element analysis unit, a second processing element analysis unit, and a third processing element analysis unit (hereinafter, these units are provided with reference signs 3b, 4b, and 5b for convenience), whose functions are different from those of the first processing element analysis unit 3, the second processing element analysis unit 4, and the third processing element analysis unit 5.

The following describes a structure different from Embodiment 1.

3.1 Structure (1) Third Processing Element Analysis Unit 5b

The third processing element analysis unit 5b has the same functions as the third processing element analysis unit 5, and further has a function of judging whether to maintain a scrolling state determined by a user operation even after the end of the user operation (i.e., after the end of the operation by releasing the touch display panel from being pressed).

Specifically, the third processing element analysis unit 5b judges whether motionless duration measured by the user operation judgment unit 1 has exceeded a predetermined time period (e.g., three seconds).

When judging that the motionless duration has exceeded the predetermined time period, the third processing element analysis unit 5b outputs maintenance information indicating that the determined scrolling state is to be maintained, to the first processing element analysis unit 3b and the second processing element analysis unit 4b. At this time, the third processing element analysis unit 5b transmits, to the element information storage unit 2, a notification indicating that the element information is to be stored.

When judging that the motionless duration has not exceeded the predetermined time period, the third processing element analysis unit 5b outputs reset information indicating that the determined scrolling state is to be reset to the initial state, to the first processing element analysis unit 3b and the second processing element analysis unit 4b. Furthermore, the third processing element analysis unit 5b transmits, to the UI display information creation unit 10, a notification indicating that the initial figure is to be displayed. Accordingly, the initial figure is created by the UI display information creation unit 10 and displayed by the information display unit 11.

Also, the third processing element analysis unit 5b temporarily stores therein information indicating which of the maintenance information and the reset information has been output to the first processing element analysis unit 3b and the second processing element analysis unit 4b. When the start of a user operation is detected again by the user operation judgment unit 1 and the temporarily stored information indicates that the maintenance information has been output, the third processing element analysis unit 5b transmits, to the element information storage unit 2, a notification indicating that the element information is to be output.

(2) First Processing Element Analysis Unit 3b

Upon receiving the maintenance information from the third processing element analysis unit 5b, the first processing element analysis unit 3b does not change the scrolling speed.

Upon receiving the reset information from the third processing element analysis unit 5b, the first processing element analysis unit 3b acquires a scrolling speed ("0" in the present embodiment) corresponding to the input area pixel count "0", with use of the view state conversion table T100. Then, the first processing element analysis unit 3b outputs, to the first processing unit 6, an instruction for processing pertaining to changing of a scrolling speed.

Upon receiving a request for the element information from the element information storage unit 2, the first processing element analysis unit 3b transmits the first parameter information and the first moving distance currently stored therein to the element information storage unit 2. Accordingly, the first parameter information and the first moving distance are stored in the element information storage unit 2.

When the element information is output from the element information storage unit 2, the first processing element analysis unit 3b acquires the first parameter information and the first moving distance that are stored in the element information storage unit 2. Then, the first processing element analysis unit 3b transmits an instruction for processing pertaining to changing of a scrolling speed to the first processing unit 6, based on the first parameter information. Also, the first processing element analysis unit 3b transmits the first notification indicating the first moving distance to the UI display information creation unit 10.

(3) Second Processing Element Analysis Unit 4b

Upon receiving the maintenance information from the third processing element analysis unit 5b, the second processing element analysis unit 4b does not change the size of the images.

Upon receiving the reset information from the third processing element analysis unit 5b, the second processing element analysis unit 4b acquires a size ("1" in the present embodiment) corresponding to the input area pixel count "0", with use of the view state conversion table T100. Then, the second processing element analysis unit 4b outputs, to the second processing unit 7, an instruction for processing pertaining to changing of the size of the images.

Upon receiving a request for the element information from the element information storage unit 2, the second processing element analysis unit 4b transmits the second parameter information and the second moving distance currently stored therein to the element information storage unit 2. Accordingly, the second parameter information and the second moving distance are stored in the element information storage unit 2.

When the element information is output from the element information storage unit 2, the second processing element analysis unit 4b acquires the second parameter information and the second moving distance that are stored in the element information storage unit 2. Then, the second processing element analysis unit 4b transmits an instruction for processing pertaining to changing of the size of images to the second processing unit 7, based on the second parameter information. Also, the second processing element analysis unit 4b transmits the second notification indicating the second moving distance to the UI display information creation unit 10.

3.2 Operations

The following describes an operation of the information display device 100 when displaying a plurality of images.

Note that processing for changing a scrolling speed and a display size by a drag operation is performed in the same manner as the processing shown in the flowchart of FIG. 5 according to Embodiment 1. Therefore, descriptions thereof are omitted here.

Figure 11:
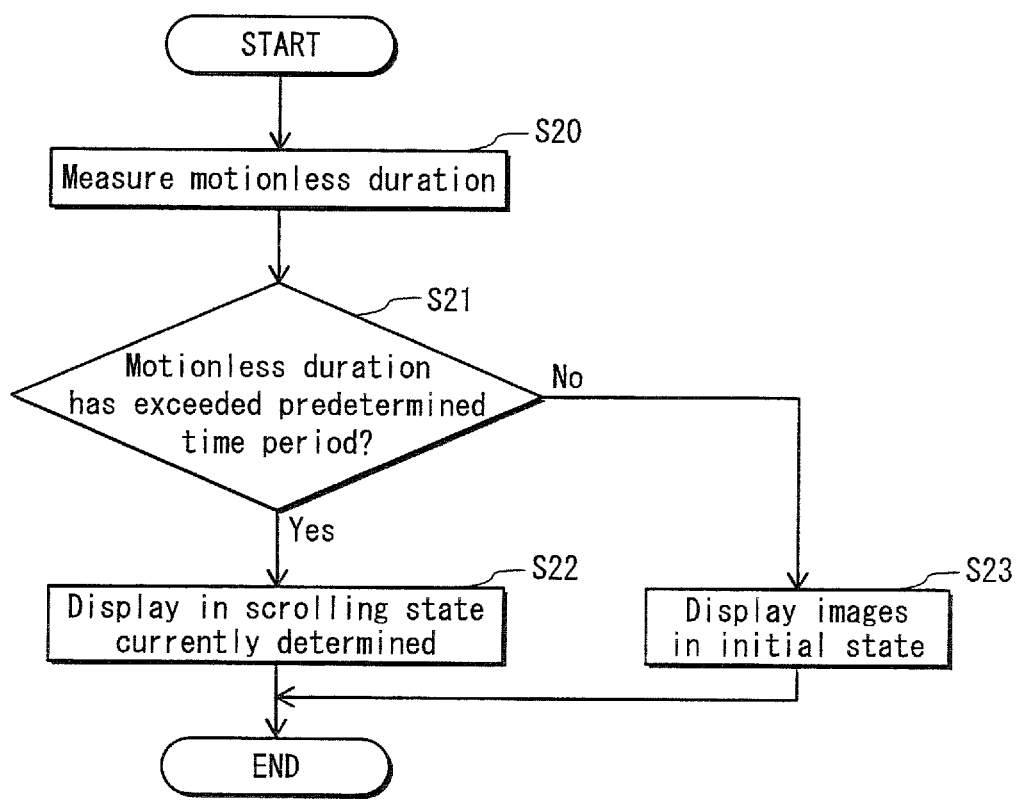
FIG. 11 is a flowchart showing operations pertaining to maintenance and change of a scrolling state using motionless duration.

The following describes operations pertaining to maintenance and change of a scrolling state using motionless duration, with reference to the flowchart of FIG. 11.

The user operation judgment unit 1 measures motionless duration (step S20).

The third processing element analysis unit 5b judges whether the measured motionless duration has exceeded a predetermined time period (e.g., three seconds) (step S21).

When the third processing element analysis unit 5b judges that the motionless duration has exceeded the predetermined time period ("Yes" in step S21), the information display unit 11 displays a plurality of images in a scrolling state (the scrolling speed and the size of images) currently determined (step S22). Specifically, the third processing element analysis unit 5b outputs the maintenance information to the first processing element analysis unit 3b and the second processing element analysis unit 4b. Also, the third processing element analysis unit 5b transmits, to the element information storage unit 2, a notification indicating that the element information is to be stored. Upon receiving the maintenance information from the third processing element analysis unit 5b, the first processing element analysis unit 3b does not change the scrolling speed. Upon receiving the maintenance information from the third processing element analysis unit 5b, the second processing element analysis unit 4b does not change the size of images. Upon receiving a request for the element information from the element information storage unit 2, the first processing element analysis unit 3b transmits the first parameter information and the first moving distance currently stored therein to the element information storage unit 2. Upon receiving a request for the element information from the element information storage unit 2, the second processing element analysis unit 4b transmits the second parameter information and the second moving distance currently stored therein to the element information storage unit 2.

When the third processing element analysis unit 5b judges that the motionless duration has not exceeded the predetermined time period ("No" in step S21), the information display unit 11 stops displaying images by scrolling through the images, and displays the images based on the initial values (step S23). Specifically, the third processing element analysis unit 5b outputs the reset information to the first processing element analysis unit 3b and the second processing element analysis unit 4b. Furthermore, the third processing element analysis unit 5b transmits, to the UI display information creation unit 10, a notification indicating that the initial figure is to be displayed. Accordingly, the initial figure is created by the UI display information creation unit 10 and displayed by the information display unit 11. Upon receiving the reset information from the third processing element analysis unit 5b, the first processing element analysis unit 3b acquires a scrolling speed ("0" in the present embodiment) corresponding to the input area pixel count "0", with use of the view state conversion table T100. Then, the first processing element analysis unit 3b outputs, to the first processing unit 6, an instruction for processing pertaining to changing of a scrolling speed. Upon receiving the reset information from the third processing element analysis unit 5b, the second processing element analysis unit 4b acquires a size ("1" in the present embodiment) corresponding to the input area pixel count "0", with use of the view state conversion table T100. Then, the second processing element analysis unit 4b outputs, to the second processing unit 7, an instruction for processing pertaining to changing of the size of images. As a result, the first processing unit 6 and the second processing unit 7 perform processing for changing view states (i.e., the scrolling speed and the size of images) based on the corresponding initial values, enabling the information display unit 11 to display the images based on the initial values.

The third processing element analysis unit 5b temporarily stores therein information indicating which of the maintenance information and the reset information has been output to the first processing element analysis unit 3b and the second processing element analysis unit 4b. When the start of a user operation is detected again by the user operation judgment unit 1 and the temporarily stored information indicates that the maintenance information has been output, the third processing element analysis unit 5b transmits, to the element information storage unit 2, a notification indicating that the element information is to be output. When the element information is output from the element information storage unit 2, the first processing element analysis unit 3b acquires the first parameter information and the first moving distance that are stored in the element information storage unit 2. Then, the first processing element analysis unit 3b transmits an instruction for processing pertaining to changing of a scrolling speed to the first processing unit 6, based on the first parameter information. Also, the first processing element analysis unit 3b transmits the first notification indicating the first moving distance to the UI display information creation unit 10. When the element information is output from the element information storage unit 2, the second processing element analysis unit 4b acquires the second parameter information and the second moving distance that are stored in the element information storage unit 2. Then, the second processing element analysis unit 4b transmits an instruction for processing pertaining to changing of the size of images to the second processing unit 7, based on the second parameter information. Also, the second processing element analysis unit 4b transmits the second notification indicating the second moving distance to the UI display information creation unit 10. This makes it possible to display a rectangular image that was displayed at the end of the previous operation, when a user operation is resumed.

3.3 Specific Example of Changing Display Mode by Reflecting User's Intention

Figure 12:
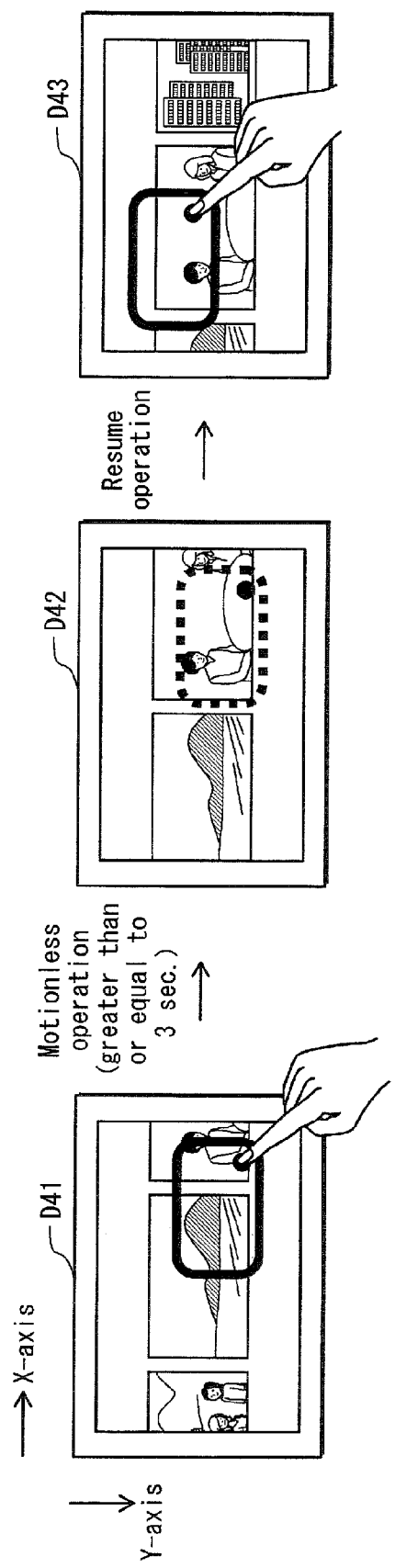
FIG. 12 shows a specific example of performing a motionless operation continuously (greater than or equal to three seconds) after a drag operation.
Figure 13:
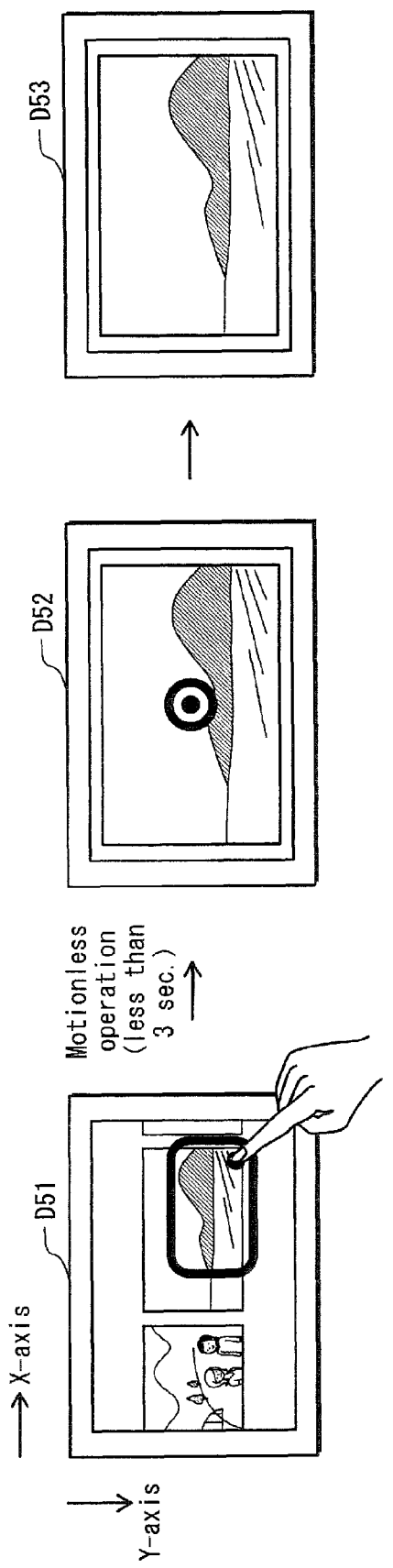
FIG. 13 shows a specific example of performing a motionless operation continuously (less than three seconds) after a drag operation.

FIGS. 12 and 13 each show processing that reflects a user's intention with respect to a scrolling state.

A screen D41 in FIG. 12 shows a state where a motionless operation is performed subsequent to a drag operation, without a break between the operations. A screen D42 shows a state where an operation for releasing the touch panel display is performed after the motionless operation in the screen D41 was performed for greater than or equal to three seconds. In this case, the scrolling state is maintained even though a finger is released from the touch panel display, as described above. Therefore, images can be viewed in a slide show in the maintained scrolling state.

A screen D43 shows a state where an operation is started from a different position. As described above, since a rectangular image is displayed based on the first and second moving distances at the time of the motionless operation, the user can perform processing for changing the scrolling state from the previous scrolling state that is a state before the operation was resumed.

A screen D51 in FIG. 13 shows a state where a motionless operation is performed subsequent to a drag operation, without a break between the operations in the same manner as the screen D41 in FIG. 12. A screen D52 shows a state where an operation for releasing the touch panel display is performed after the motionless operation in the screen D51 was performed for less than three seconds. In this case, the initial figure is displayed as described above. Then, the scrolling state is reset, and a target image is displayed based on the initial values of the scrolling speed and the size of images. A screen D53 shows a display mode where the target image is displayed in the aforementioned manner.

The processing as shown in FIGS. 12 and 13 enables the intention of a user to be reflected according to a user operation, allowing the user to browse and search images more easily.

3.4 Mechanism for Reflecting User's Intention

Figure 14:
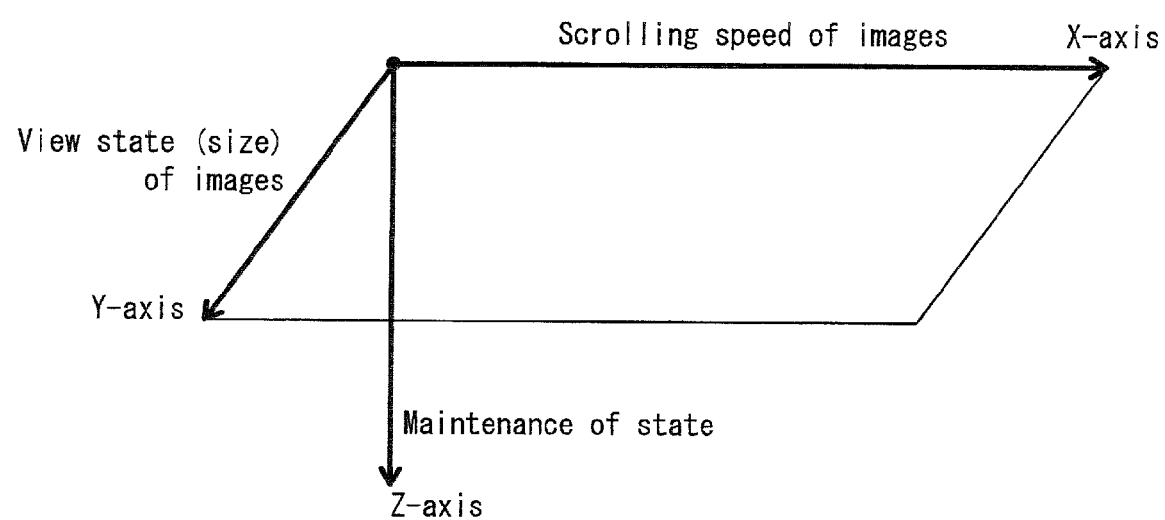
FIG. 14 shows a mechanism for reflecting a user's intention with respect to the scrolling state of images and changing of the scrolling state.

FIG. 14 shows a mechanism for reflecting a user's intention with respect to the scrolling state of images and changing of the scrolling state. As shown in FIG. 14, a three-dimensional orthogonal coordinate system (X-, Y-, and Z-axes) is introduced so as to reflect a user's intention. In the three-dimensional orthogonal coordinate system, it is possible to change the scrolling speed of images along the X-axis, the view state of images along the Y-axis, and the pressing duration (i.e., time period for a motionless operation) along the Z-axis. This makes it possible to reflect a user's intention such as maintaining a scrolling state or changing to a display mode based on the initial values of the scrolling speed and the size of images, in addition to a user's intention with respect to a scrolling state such as a scrolling speed and view states.

4. Embodiment 4

The following describes Embodiment 4 pertaining to the present invention, with reference to the drawings. Embodiment 4 relates to changing of a scrolling speed to a speed (hereinafter "physical speed") corresponding to reduction and enlargement of images.

Note that in Embodiment 4, the same reference signs are given to components having the same functions as Embodiment 1, and descriptions thereof are omitted since descriptions in Embodiment 1 are applicable thereto. Also, unless otherwise described, the structure of Embodiment 4 is the same as that of Embodiment 1, including the fundamental structure of the information display device.

Embodiment 4 is different from Embodiment 1 with respect to a first processing element analysis unit and a second processing element analysis unit (hereinafter, these units are provided with reference signs 3c and 4c for convenience), whose functions are different from those of the first processing element analysis unit 3 and the second processing element analysis unit 4.

The following describes a structure different from Embodiment 1.

4.1 Structure (1) Second Processing Element Analysis Unit 4c

The second processing element analysis unit 4c determines second parameter information pertaining to a view state (i.e., size), in the same manner as the second processing element analysis unit 4 in Embodiment 1.

The second processing element analysis unit 4c calculates the ratio of the determined second parameter information to the previous second parameter information that was held up to this point in time (i.e., that was held immediately before the determination of the second parameter information), and outputs ratio information indicating the calculated ratio to the first processing element analysis unit 3c.

The second processing element analysis unit 4c transmits an instruction for processing pertaining to changing of the size of images to the second processing unit 7, and the second notification to the UI display information creation unit 10, in the same manner as the second processing element analysis unit 4 in Embodiment 1.

Also, in the case of receiving a request for element information from the element information storage unit 2, and, in a case where the element information is output from the element information storage unit 2, the second processing element analysis unit 4c performs the same processing as the second processing element analysis unit 4 according to Embodiment 1.

(2) First Processing Element Analysis Unit 3c

The first processing element analysis unit 3c acquires a physical parameter (i.e., first moving distance) from the user operation judgment unit 1, and acquires the ratio information from the second processing element analysis unit 4c.

The first processing element analysis unit 3c calculates a speed corresponding to the size of images by multiplying the scrolling speed currently held therein by the ratio indicated by the ratio information.

Also, the first processing element analysis unit 3c acquires a scrolling speed corresponding to the first moving distance, with use of the view state conversion table T100, and adds the scrolling speed to the speed corresponding to the size. Then, the first processing element analysis unit 3c determines a result of the addition to be the first parameter information pertaining to a view state (i.e., scrolling speed).

The first processing element analysis unit 3c transmits an instruction for processing pertaining to a scrolling speed to the first processing unit 6, and the first notification to the UI display information creation unit 10, in the same manner as the first processing element analysis unit 3 in Embodiment 1.

Also, in the case of receiving a request for element information from the element information storage unit 2, and, in a case where the element information is output from the element information storage unit 2, the first processing element analysis unit 3c performs the same processing as the first processing element analysis unit 3 according to Embodiment 1.

4.2 Operations

Figure 15:
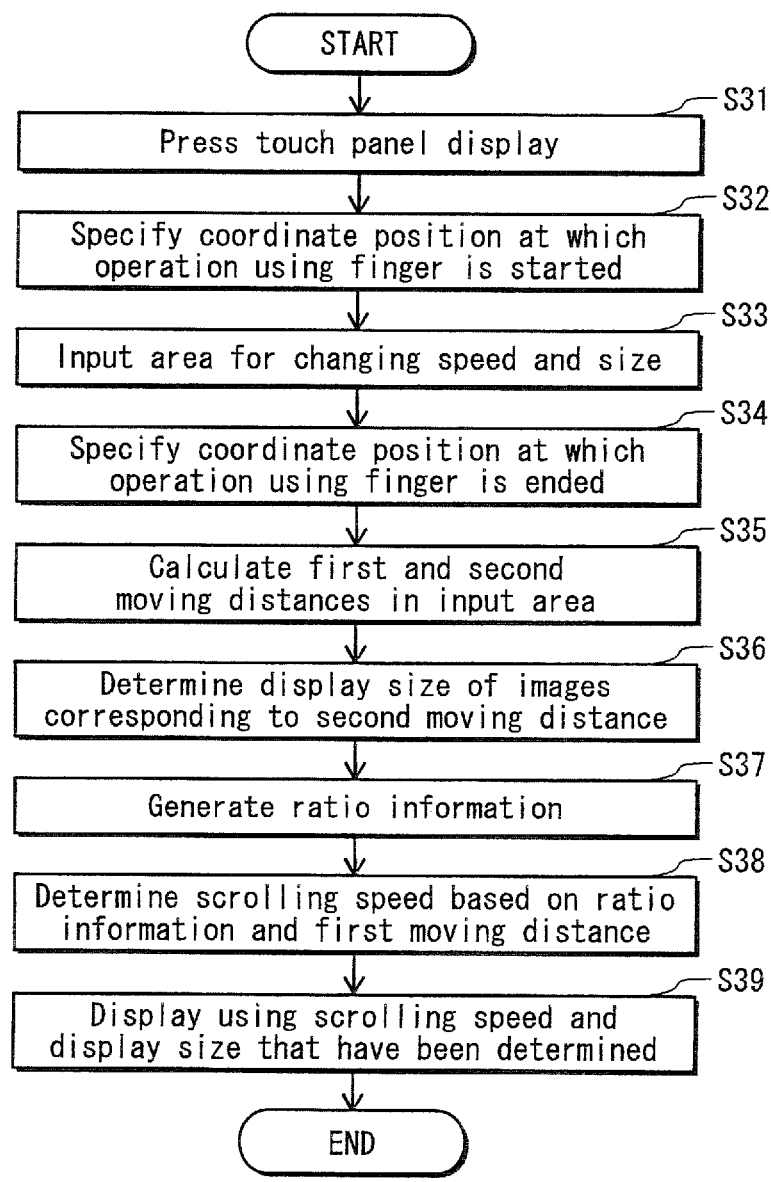
FIG. 15 is a flowchart showing an operation of an information display device according to Embodiment 4.

FIG. 15 is a flowchart showing an operation of an information display device according to the present embodiment.

The coordinate detection unit 12 detects the start of an operation when the touch panel display 101 is pressed by a user (step S31).

The coordinate detection unit 12 specifies a coordinate position at which the operation using a finger is started, and outputs, to the user operation judgment unit 1, information indicating that the start of the operation has been detected and the specified coordinate position (step S32). Upon receiving the information and the coordinate position, the user operation judgment unit 1 judges that a user operation is started.

The coordinate detection unit 12 receives an input of an area for changing, at the same time, a scrolling speed and an image size that is a display state (step S33). This input is performed, for example, by specifying the input area by a drag operation using a finger with the touch panel display being pressed.

The coordinate detection unit 12 specifies a coordinate position at which the operation is ended by an operation for releasing the touch display panel from being pressed (step S34).

The user operation judgment unit 1 calculates the first moving distance and the second moving distance, based on the specified coordinate positions, namely the coordinate position at which the operation is started and the coordinate position at which the operation is ended (step S35).

The second processing element analysis unit 4c determines the display size of images corresponding to the calculated second moving distance (step S36). Also, the second processing element analysis unit 4c calculates the ratio of the determined display size to the previous display size that was held up to this point in time (i.e., that was held immediately before the determination of the display size), and generates ratio information indicating the calculated ratio (step S37).

The first processing element analysis unit 3c determines a scrolling speed based on the ratio information and the first moving distance (step S38). Specifically, the first processing element analysis unit 3c calculates a speed corresponding to the size of images by multiplying the scrolling speed currently held therein by the ratio indicated by the ratio information. Then, the first processing element analysis unit 3c adds a scrolling speed corresponding to the first moving distance to a result of the calculation so as to determine a scrolling speed.

The information display unit 11 displays a plurality of images based on the size of images and the scrolling speed that have been determined in steps S36 and S38 (step S39).

4.3 Specific Example

Figure 16A:
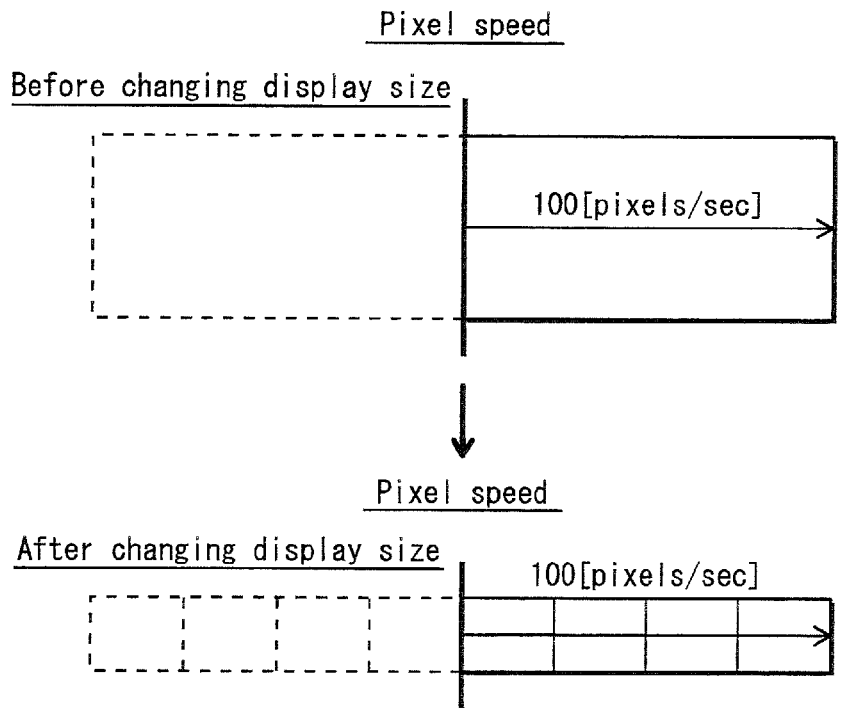
FIG. 16A shows a case where a change in the display size of images is not taken into consideration in changing a scrolling speed.
Figure 16B:
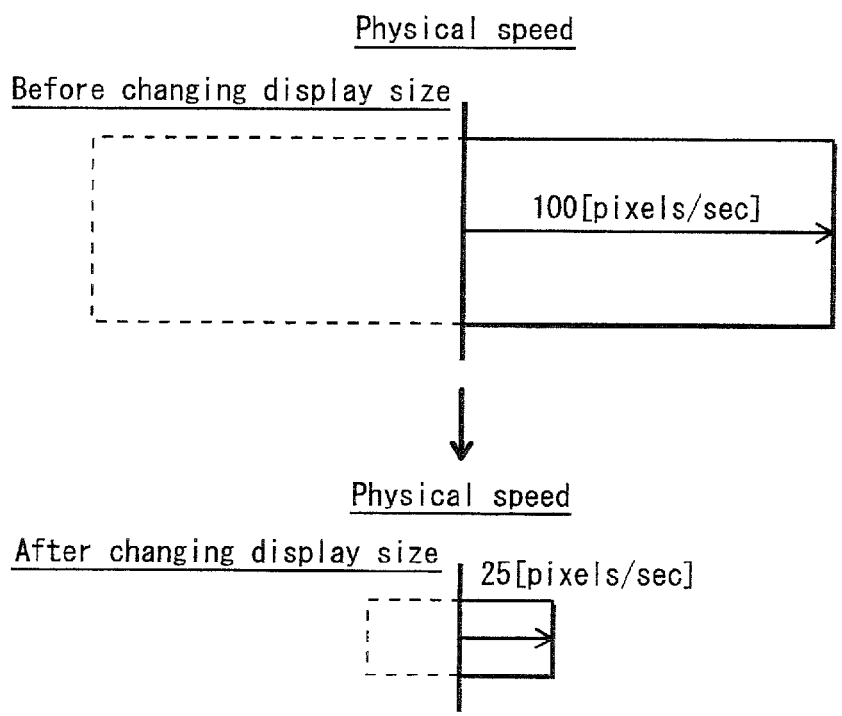
FIG. 16B shows a case where a change in the display size of images is taken into consideration in changing a scrolling speed.

FIG. 16A shows a case where a change in the display size of images is not taken into consideration in changing a scrolling speed when the images are displayed, and FIG. 16B shows a case where a change in the display size of images is taken into consideration in changing a scrolling speed when the images are displayed.

FIG. 16A shows a case where a change in the display size of images is not taken into consideration in changing a scrolling speed. Here, a speed in a case where a change in the display size of images is not taken into consideration in changing a scrolling speed is referred to as "pixel speed". Also, in the same manner as Embodiment 1, it is assumed that the size of images and the display line count are changed by an operation in the vertical direction of the touch panel display 101, and a scrolling speed is changed by an operation in the horizontal direction. In general, changing of the size of images alone (i.e., a user operation only in the vertical direction) does not change a scrolling speed on the touch panel display 101, and the scrolling speed is determined by the amount of the movement of pixels on the touch panel display 101 during a predetermined time period.

As shown in FIG. 16A, a plurality of images are moving at a pixel speed of 100 pixels/sec before the display size is changed. Assume here that a display size is determined to be "¼" by a user operation, namely the length of a side of each image currently displayed is set to ¼ as a display size. In this case, the pixel speed is not changed and is maintained at the speed of 100 pixels/sec, as shown in the part of "after changing display size" in FIG. 16A. However, since the length of a side of each image is set to ¼ as a display size, it appears to the user as if the images were being scrolled through at a speed four times faster than its actual speed. This is because every four pixels of each image is reduced to one pixel.

FIG. 16B shows a case where a change in the display size of images is taken into consideration in changing a scrolling speed.

As shown in FIG. 16B, a plurality of images are moving at a pixel speed of 100 pixels/sec before the display size is changed, in the same manner as the speed before changing the display size in FIG. 16A. Assume here that a display size is determined to be "¼" by a user operation in the same manner as described above. In this case, the speed before changing the display size is multiplied by the ratio of a display size after the change which is based on the display size before the change, so as not to change the speed perceived by the user, as shown in the part of "after changing display size" in FIG. 16B. Here, since the length of a side of each image is set to ¼ as a display size, the moving speed per pixel needs to be reduced by ¼ as well. Therefore, the scrolling speed is set to 25 pixels/sec by multiplying the current speed, which is 100 pixels/sec, by the ratio "¼". This makes it possible to change the scrolling speed in accordance with the physical speed (i.e., speed perceived by the user), when changing the display size during a scrolling operation. As a result, images are displayed to coincide with the perspective of humans, allowing a user to browse and search images more easily.

5. Embodiment 5

The following describes Embodiment 5 pertaining to the present invention, with reference to the drawings. Embodiment 5 relates to display of candidates for the next operation when controlling a scrolling state.

Note that in Embodiment 5, the same reference signs are given to components having the same functions as Embodiment 1, and descriptions thereof are omitted since descriptions in Embodiment 1 are applicable thereto. Also, unless otherwise described, the structure of Embodiment 5 is the same as that of Embodiment 1, including the fundamental structure of the information display device.

Embodiment 5 is different from Embodiment 1 with respect to a UI display information creation unit (hereinafter, this unit is provided with a reference sign 10*d* for convenience), whose functions are different from those of the UI display information creation unit 10.

The following describes a structure different from Embodiment 1.

5.1 Structure (1) UI Display Information Creation Unit 10*d*

The UI display information creation unit 10*d* has the following functions, in addition to the functions of the UI display information creation unit 10 according to Embodiment 1.

The UI display information creation unit 10*d* creates information indicating how a scrolling speed is to be changed by the next drag operation, from the coordinate position at which pressing is currently performed, with respect to the right and left directions along the X-axis of the touch display panel 101. Also, the UI display information creation unit 10*d* creates information indicating how the display size of images is to be changed by the next drag operation, from the coordinate position at which pressing is currently performed, with respect to the upper and lower directions along the Y-axis of the touch display panel 101. Then, the UI display information creation unit 10*d* transmits these information pieces to the information display unit 11.

For example, the UI display information creation unit 10*d* creates information indicating that a scrolling speed becomes faster in the right direction along the X-axis, and information indicating that a scrolling speed becomes slower in the left direction along the X-axis. Also, the UI display information creation unit 10*d* creates information indicating that a display size becomes larger in the upper direction along the Y-axis, and information indicating that a display size becomes smaller in the lower direction along the Y-axis.

5.2 Specific Example

Figure 17:
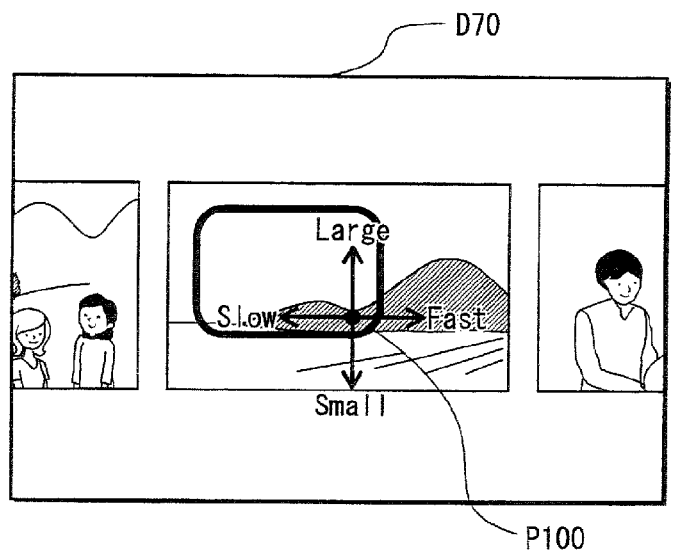
FIG. 17 shows one example of a screen that displays candidates for the next operation.

FIG. 17 shows a screen that displays candidates for the next operation at the time of controlling a scrolling state along two axes. Here, it is assumed that the size of images is changeable in the vertical direction (i.e., Y-axis direction) and a scrolling speed is changeable in the horizontal direction (i.e., X-axis direction), in the same manner as Embodiment 1. As shown in FIG. 17, starting from a coordinate position P100 on a screen D70, at which pressing is currently performed, "fast" and "slow" are shown respectively in the right direction and the left direction along the X-axis. In this way, it is clear at a glance that a scrolling speed becomes faster by increasing an operational area by an operation in the right direction along the horizontal axis, and that the scrolling speed becomes slower by reducing the operational area by an operation in the left direction along the horizontal axis. Also, starting from the coordinate position P100, "large" and "small" are shown respectively in the upper direction and the lower direction along the Y-axis. In this way, it is clear at a glance that the size of images becomes larger by reducing the operational area by an operation in the upper direction along the vertical axis, and that the size of images becomes smaller by increasing the operational area by an operation in the lower direction along the horizontal axis.

This makes it possible for a user to understand what operations are available next when performing a scrolling operation or other operations on a screen, and to perform an intuitive operation with confidence. As a result, the user does not need to remember an operational structure, etc., allowing the user to browse and search images more easily.

6. Embodiment 6

The following describes Embodiment 6 pertaining to the present invention, with reference to the drawings. Embodiment 6 relates to display of metadata pertaining to contents. For example, it is necessary to reduce the size of images to display many images at once. However, when the size of images is reduced, the amount of information per image becomes small. Therefore, in the present embodiment, pieces of metadata corresponding to images that are displayed by being scrolled through is displayed in a display area which is a redundant area obtained by reducing the size of images.

Note that in Embodiment 6, the same reference signs are given to components having the same functions as Embodiment 1, and descriptions thereof are omitted since descriptions in Embodiment 1 are applicable thereto. Also, unless otherwise described, the structure of Embodiment 6 is the same as that of Embodiment 1, including the fundamental structure of the information display device.

Embodiment 6 is different from Embodiment 1 with respect to a content information management unit and a content display information creation unit (hereinafter, these units are provided with reference signs 8*e* and 9*e* for convenience), whose functions are different from those of the content information management unit 8 and the content display information creation unit 9.

The following describes a structure different from Embodiment 1.

6.1 Structure (1) Content Information Management Unit 8*e*

The content information management unit 8*e* manages (stores) a plurality of contents (images, in this example) and corresponding information (metadata) for each content, in the same manner as the content information management unit 8 according to Embodiment 1. Specifically, each piece of metadata includes color information of a corresponding image, and also includes, if the image includes a person (if a person is recognized in the image), an image of the face of the person. The color information includes first color information and second color information, where the first color information indicates a representative color (i.e., average color) of an upper area of a corresponding image and the second color information indicates a representative color of a lower area of the corresponding image when the image is divided into two areas: the upper area and the lower area.

(2) Content Display Information Creation Unit 9e

The content display information creation unit 9e creates information for displaying contents, and transmits the information to the information display unit 11, in the same manner as the content display information creation unit 9 according to Embodiment 1. Here, the information is created based on the information pertaining to display of contents from the first processing unit 6 and the second processing unit 7, and the content information acquired from the content information management unit 8e.

Specifically, the content display information creation unit 9e specifies a first display area and one or more second display areas on a display screen, based on the display size of images that has been determined. The first display area is an area for displaying the images. Each second display area is an area for displaying pieces of metadata corresponding to the images.

Upon receiving, from the first processing unit 6, the buffer capacity to be ensured and the time interval at which the images to be displayed are read, the content display information creation unit 9e ensures the buffer capacity, sequentially reads the images to be displayed and pieces of metadata (i.e., first color information, second color information, and if a person is included in a corresponding image, an image of the face of the person) corresponding to the images at the time interval, and stores the images and the pieces of metadata into the buffer. Then, the content display information creation unit 9e creates information to be displayed on one screen, based on the display size of the images to be displayed and the number of images to be displayed on one screen, which are received from the second processing unit 7. Then, the content display information creation unit 9e controls the display of the information display unit 11, so that the information to be displayed on one screen is displayed in a first display area and the pieces of metadata corresponding to the images to be displayed are displayed in a second display area.

6.2 Specific Example

The following describes a specific example of displaying a plurality of images, together with pieces of metadata (i.e., first color information, second color information, and if a person is included in a corresponding image, an image of the face of the person) corresponding to the images.

Figure 18:
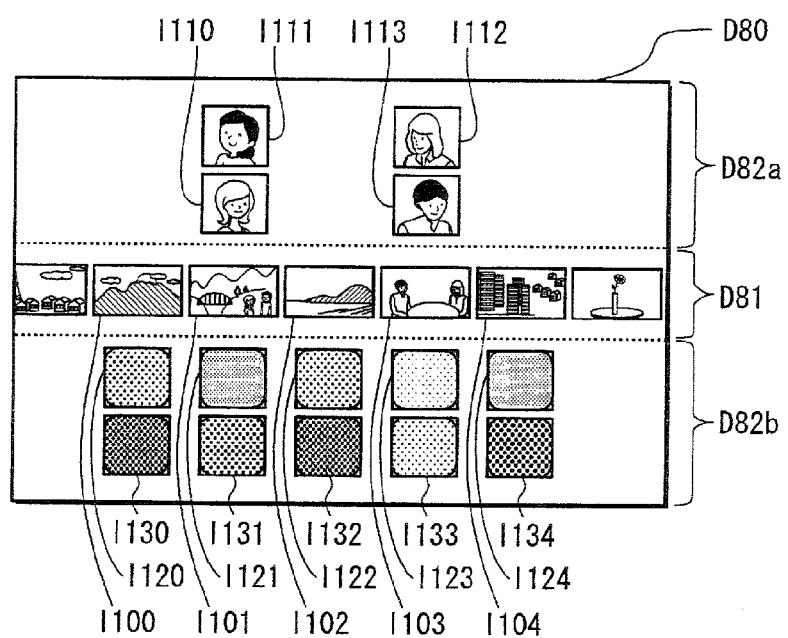
FIG. 18 shows a specific example of displaying pieces of metadata corresponding to images, when displaying the images by scrolling through the images after reducing a size thereof.

FIG. 18 shows a specific example of displaying pieces of metadata corresponding to images, when displaying the images by scrolling through the images after reducing a size thereof.

As shown in FIG. 18, the content display information creation unit 9e divides a screen D80 into a first display area D81 for displaying images and second display areas D82a and D82b for displaying pieces of metadata corresponding to the images, in accordance with the display size of the images, and displays the images and the pieces of metadata in the first and second display areas D81, D82a and D82b.

In the first display area D81, images I100 to I104 are displayed by being scrolled through.

The second display area D82a is an area for, if a person is included in an image to be displayed (if a person is recognized in the image), displaying an image of the face of the person.

In FIG. 18, each of the images I101 and I103 includes people. Therefore, face images I110 to I113, which are images of the faces of the people included in the images I101 and I103, are displayed in the second display area D82a. Note that the face images I110 and I111 correspond to the people included in the image I101, and the face images I112 and I113 correspond to the people included in the image I103.

Also, the face images I110 to I113 are displayed to be positioned immediately above the corresponding images I101 and I103.

The second display area D82b is an area for displaying pairs of the first and second color information pieces that each correspond to a different image to be displayed. In FIG. 18, pieces of first color information I120 to I124 and pieces of second color information I130 to I134 that correspond to the images I100 to I104 are displayed to be positioned immediately below the corresponding images I100 to I104.

As described above, by displaying pieces of metadata (i.e., first color information, second color information, and if a person is included in a corresponding image, an image of the face of the person) corresponding to the images to be scrolled through, the user can easily grasp the contents of the images when viewing the images.

7. Modifications

Although the present invention has been described based on the various embodiments described above, the present invention is of course not limited to these embodiments. For example the following modifications are possible.

(1) In Embodiment 1, only the display size is changed in accordance with the second moving distance. Also, in Embodiment 2, only the display line count is changed in accordance with the second moving distance. However, Embodiment 1 may be combined with Embodiment 2, so that both the display size and the display line count are changed in accordance with the second moving distance.

As shown in FIG. 19, an element information storage unit of an information display device according to the present modification has a view state conversion table T300, which is obtained by combining the view state conversion table T100 according to Embodiment 1 with the view state conversion table T200 according to Embodiment 2.

Also, a second processing element analysis unit of the information display device according to the present modification has both of the functions of the second processing element analysis unit 4 according to Embodiment 1 and the second processing element analysis unit 4a according to Embodiment 2.

With the stated structure, the second processing element analysis unit according to the present modification determines a display size and a display line count, in accordance with the second moving distance along the Y-axis, with use of the view state conversion table T300.

Figure 20:
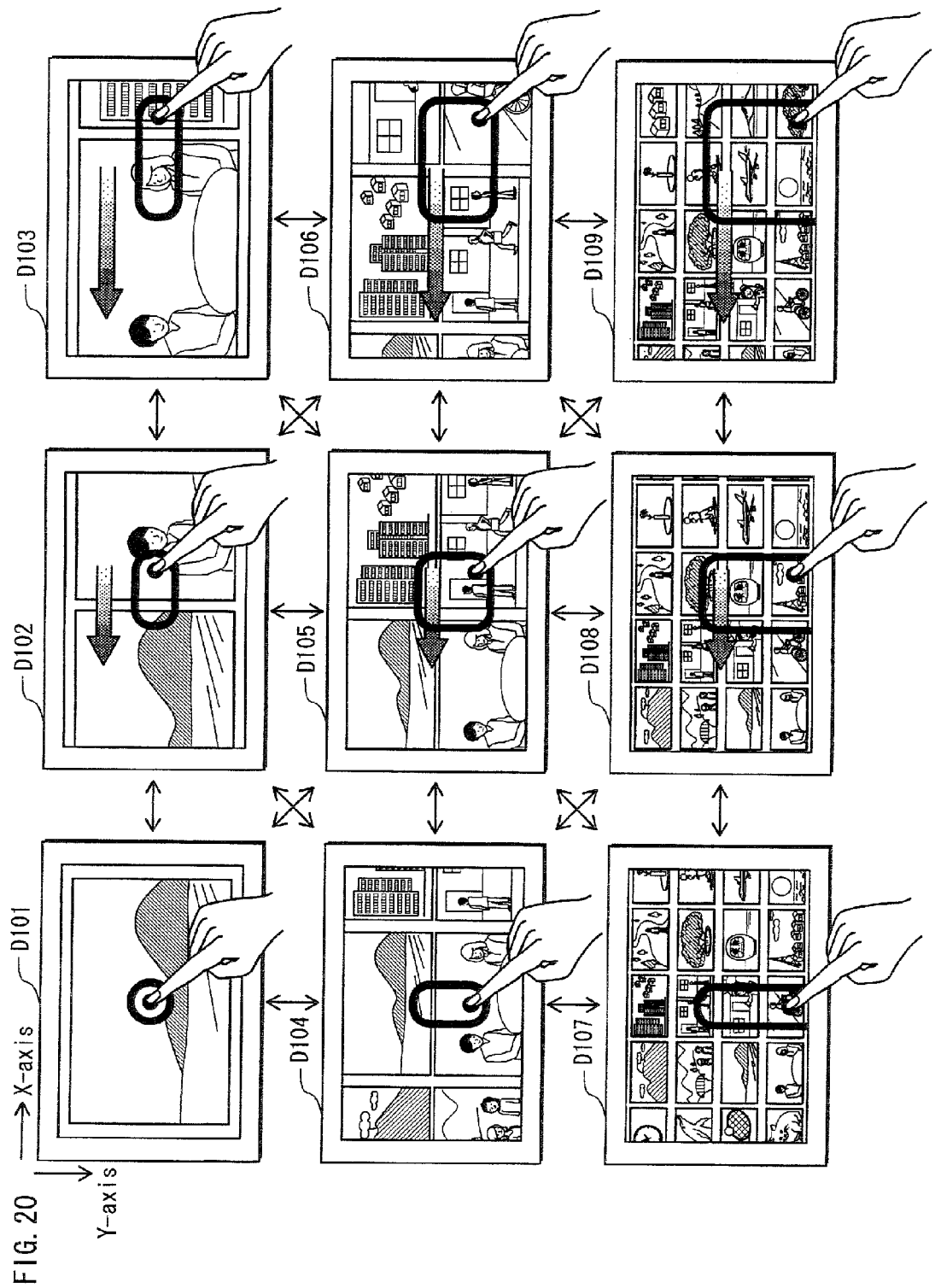
FIG. 20 shows a specific example of changing a scrolling speed, a display size, and a display line count.

FIG. 20 shows an example of changing, by a user operation, a scrolling speed, a display size, and a display line count when displaying a plurality of images. A screen D101 is a screen at the start of an operation. In the same manner as Embodiment 1, the initial figure is displayed at the start of the operation. The user can perform a drag operation so as to change the display state in the screen D101 to each of the scrolling states from screens D102 to D109.

As shown by the transitions from the screen D101 to the screens D102 and D103, from the screen D104 to the screens D105 and D106, and from the screen D107 to the screens D108 and D109, the longer the length (i.e., first moving distance) along the horizontal axis is in the drag operation by the user, the higher the scrolling speed is, in the same manner as Embodiments 1 and 2.

Also, as shown by the transitions from the screen D101 to the screens D104 and D107, from the screen D102 to the screens D105 and D108, and from the screen D103 to the screens D106 to D109, the longer the length (i.e., second moving distance) along the vertical axis is in the drag operation by the user, the smaller the display size is and the larger the display line count is.

Furthermore, when the user performs a drag operation in a diagonal direction, as shown by the transitions from the screen D101 to the screens D105 and D109 and from the screen D103 to the screens D105 and D107, the length in the horizontal direction and the length in the vertical direction are each calculated separately as a coordinate component along a different axis. This makes it possible to change the scrolling speed, the display size, and the display line count at the same time.

(2) In the above embodiments, the input information includes physical parameters such as operation start/end instructions, and a coordinate position at which pressing on the display has been performed. However, it is not limited to such.

The input information may include the area of the touch panel pressed by a user's finger at the start/end of an operation. For example, the user operation judgment unit 1 judges that an operation is started upon detecting that the value of the area has changed from "0" to a value larger than "0", and judges that the operation is ended upon detecting that the value of the area has changed from the value larger than "0" back to "0".

(3) In the above embodiments, the information display device includes three processing element analysis units and two processing units. However, it is not limited to such. For example, it is possible to provide a fourth processing element analysis unit and a third processing unit so as to perform processing for changing the amount of information pertaining to additional contents that are to be displayed additionally (i.e., view state pertaining to display of metadata).

(4) In the above embodiments, each of the processing element analysis units handles a different physical parameter. However, it is not limited to such.

It is possible that all of the processing element analysis units handle the same physical parameter. For example, in Embodiment 1 described above, the first processing element analysis unit 3 and the second processing element analysis unit 4 may both acquire the same physical parameter (e.g., first moving distance), and convert the physical parameter into parameters each pertaining to a different view state (e.g., scrolling speed and display size).

(5) In the above embodiments, the information display device may further include a screen state checking unit for checking the state of the screen. Then, the information display device may change the number or type of processing element analysis units, the number or type of processing units, the content of processing etc., in accordance with the state of the screen.

(6) In the above embodiments, processing elements for changing the view states of images are a scrolling speed, a display size, and a display line count. However, it is not limited to such. The processing elements may be other than the scrolling speed, the display size, and the display line count as long as they can change the view state of the images.

(7) The contents of the view state conversion tables T100, T200, and T300 described above are merely an example, and are not limited to such.

For example, the column of the input area pixel count may be divided into partitions by the unit of 50 counts, and each partition may be associated with the corresponding scrolling speed, size and display line counts. Also, each of the tables T100, T200 and T300 may additionally include a processing element for changing a view state, which is other than a scrolling speed, a size, and a display line count.

Also, the input area pixel count in each of the view state conversion tables T100, T200 and T300 is commonly used for both the X-axis and the Y-axis. However, it is not limited to such. The input area pixel count used for the X-axis may be different from the input area pixel count used for the Y-axis. For example, FIG. 21 shows a modification made to the view state conversion table T100. As shown in FIG. 21, a view state conversion table T400 includes X-axis items and Y-axis items. The X-axis items include a first input area pixel count and a scrolling speed, and the Y-axis items include a second input area count and a size. Since details of each item are the same as Embodiment 1, descriptions thereof are omitted here.

The view state conversion table T200 may be modified by replacing the size shown in FIG. 21 with the display line count. Alternatively, the view state conversion table T200 may be modified by adding the display line count to the Y-axis items shown in FIG. 21.

Also, the view state conversion table T400 maybe divided into two tables, i.e., a table including the X-axis items and a table including the Y-axis items.

(8) In the above embodiments, the view state conversion table is used to determine a scrolling speed, a display size and a display line count that correspond to a user operation. However, it is not limited to such.

In a case where the information display device does not have the view state conversion table, a scrolling speed, a display size and a display line count may be determined according to the following expressions 1, 2 and 3, where Lx denotes the number of pixels in the input area, as the first moving distance therein, Ly denotes the number of pixels in the input area, as the second moving distance therein, V denotes the scrolling speed, S denotes the size, N denotes the display line count, and a, b, and c each denote a proportionality constant.

<Expression 1>

$$V = a \times Lx \quad \text{(expression 1)}$$

<Expression 2>

$$S = b/Ly \quad \text{(expression 2)}$$

<Expression 3>

$$N = Ly/c \quad \text{(Expression 3)}$$

The above expressions are only simple expressions of proportion and inverse proportion; however, the expressions are not limited to such, as long as they can be expressed by function expressions such as exponential functions or trigonometric functions.

(9) In the above embodiments, it is possible to provide the maximum speed for the scrolling speed, the minimum size for the display size, and the maximum line count for the display line count.

(10) In Embodiment 3 described above, the scrolling state is reset to the initial state if the motionless duration has not exceeded the predetermined time period (three seconds). However, it is not limited to such.

The scrolling state may be gradually regressed to the original state (reset to the initial state). For example, assume that the scrolling speed and the display size that have been determined by a user operation are 200 and ¼, respectively. In this case, if it is judged that the scrolling state is not to be maintained, the scrolling speed is gradually changed from 200 to 100 and then to 0 (zero) while the display size is gradually changed from ¼ to ½ and then to 1. To gradually change the scrolling speed, the scrolling speed and the display size that have been determined by the user operation and the view state conversion table T100 may be used, so as to sequentially acquire, from the view state conversion table T100, scrolling speeds that fall between the range of the determined scrolling speed and 0 (zero), and to sequentially acquire, from the view state conversion table T100, sizes that fall between the range of the determined display size and 1.

(11) In Embodiment 3 described above, the motionless duration is used to judge whether to maintain the scrolling speed and the display size. However, it is not limited to such.

The judgement as to whether to maintain the scrolling speed and the display size may be performed with use of any of the following: the area of a user's finger which is pressing the screen; a clicking (double-clicking) operation at a position in which a motionless operation is being performed; the amount of pressing pressure; a multi-touch operation (simultaneously pressing both a starting point and an ending point); and a particular user operation (an operation for drawing a circle or switching between menu items).

(12) In Embodiment 5 described above, the following UI displays are acceptable if the maximum speed is set for the scrolling speed and the minimum size is set for the display size.

If the scrolling speed has reached the maximum speed, "slow" may be indicated by only a left arrow along the X-axis. If the scrolling speed has reached the minimum speed ("0"), "fast" may be indicated by only a right arrow along the X-axis. Also, if the display size has reached the maximum size ("1"), "small" may be indicated by only a down arrow along the Y-axis. If the display size has reached the minimum size, "large" may be indicated by only an up arrow along the Y-axis.

Also, in a case where Embodiment 5 is combined with Embodiment 3, "press longer than or equal to three seconds: maintain the current state", "press less than three seconds: back to the initial state", etc. may be displayed on the screen as candidates for an operation relating to changing of the scrolling state.

Alternatively, it is possible to display candidates for the next operation when changing the scrolling state of the screen.

(13) In Embodiment 6 described above, the color information and a face image are included in metadata. However, it is not limited to such.

The metadata may include an image of the face of an animal, an image of a building, and information relating to images, such as the time at which an image was captured, place information, and a situation in which an image was captured, in addition to the aforementioned information pieces.

(14) In Embodiment 6 described above, pieces of metadata corresponding to displayed images may be displayed in a manner that, for example, the smaller the display size of the images is, the larger the display size of the metadata pieces is or the larger the number of metadata pieces is. In this way, even when scrolling through small images, the user can easily grasp the contents of the images. As a result, the user can more easily conduct browse and search with respect to more images.

(15) The following display modes are acceptable if the minimum display size is set for images for a scrolling display.

In a case where the second moving distance further increases after the second moving distance has reached the minimum display size, it is possible to extract, from images to be displayed, partial images thereof such as a person, an animal, a building, etc., and display the partial images instead of the images as a whole.

In this case, the information display device may extract, for each image managed by the content information management unit, at least one partial image included in the image, with use of a plurality of pieces of modeling data that are prepared in advance. Here, each partial image shows a characteristic object (the face of a person, an animal, a building, etc.) that is included in the corresponding image. Upon extracting at least one partial image for each image, the information display device may manage the partial images in correspondence with the images. Note that the size of the managed partial images is assumed to be greater than or equal to the minimum display size thereof.

Figure 22:
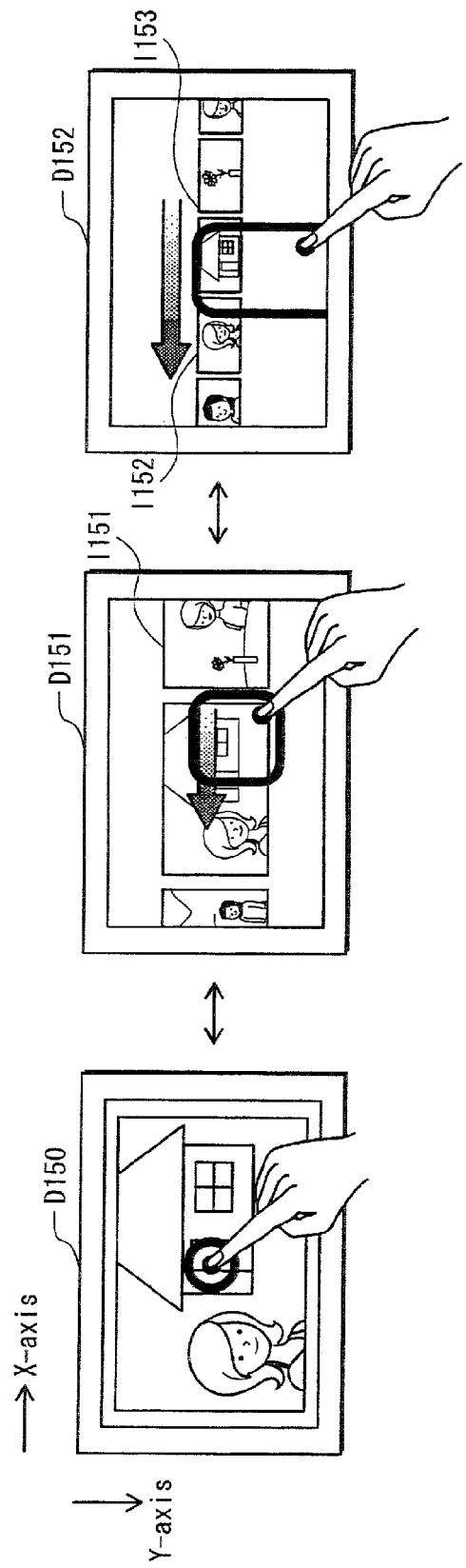
FIG. 22 shows a specific example of a screen transition where an image to be displayed is switched to pre-stored partial images.

When judging that the display size is reduced to less than or equal to the minimum size by a user operation, the second processing unit instructs the content display information creation unit to switch a display target from the images as a whole to the pre-stored partial images thereof. Upon receiving the instruction indicating the switch, the content display information creation unit switches images to be read from the images as a whole to the partial images thereof. FIG. 22 shows a screen transition of the aforementioned case. A screen D150 shows the view state of an image at the start of an operation. From this view state, the scrolling speed and the display size of the image are changed by a drag operation, so that the view state is changed as shown in a screen D151. In the screen D151, the scrolling speed is fast and the display size is small as compared to the view state of the screen D150. By further performing a drag operation (i.e., an instruction for increasing the scrolling speed and reducing the display size) from the view state of the screen D151, the displayed image is switched from an image I151 to partial images I152 and I153, each of which shows a different one of two objects (a person and a building in this example) included in the image I151.

Generally, the smaller the display size of images is, the more difficult to identify the contents of the images. In order to identify the contents of the images more easily, partial images of each image, which show objects included in the image, are displayed instead, as described above.

Note that the information display device may manage all the partial images that are extracted with use of the plurality pieces of modeling data. Alternatively, the information display device may manage only partial images that match any of pre-registered people, animals, buildings, etc.

Also, the information display device may display only partial images showing people, animals, buildings, etc. that frequently appear in images as a whole.

(16) The information display device may allow the user to select whether to set a view state to the initial state or display images in the previous view state when a user operation is resumed.

In this case, the information display device stores the following pieces of information into the element information storage unit when a user operation is ended: the current first moving distance; the current second moving distance; and a position at which a rectangular image is currently displayed. Also, in the case of a full-screen view, the information display device further stores image numbers indicating images currently displayed into the element information storage unit, in addition to the aforementioned pieces of information. Furthermore, in the case of a stream view, the information display device further stores current search conditions and image numbers indicating images currently displayed as a search result, into the element information storage unit, in addition to the aforementioned pieces of information.

When the user operation is resumed, the UI display information creation unit of the information display device displays a menu screen that allows the user to select whether to set a view state to the initial state or display images in the previous view state.

Upon receiving, from the user, an instruction indicating whether to set a view state to the initial state or display images in the previous view state, the user operation judgment unit outputs the instruction to the third processing element analysis unit.

Upon receiving an instruction for setting a view state to the initial state, the third processing element analysis unit allocates an initial value to each of the scrolling speed and the display size.

Upon receiving an instruction for displaying images in the previous view state, the third processing element analysis unit reads, from the element information storage unit, the first moving distance, the second moving distance, the position at which the rectangular image was displayed, and the image numbers of images to be displayed. Then, the third processing element analysis unit outputs the first moving distance to the first processing element analysis unit, the second moving distance to the second processing element analysis unit, the position at which the rectangular image was displayed to the UI display information creation unit, and the image numbers to the content display information creation unit. The first processing element analysis unit, the second processing element analysis unit, the UI display information creation unit, and the content display information creation unit each perform operations described in Embodiment 1, based on the received information, thereby realizing a scrolling display from the previous view state.

Note that in a case where images were displayed in the stream view in the previous view state, the third processing element analysis unit further outputs the search conditions to the content display information creation unit. The content display information creation unit searches for images to be displayed based on the search conditions. Then, content display information creation unit specifies images that were previously displayed with use of the received image numbers, and displays the images.

Figure 23:
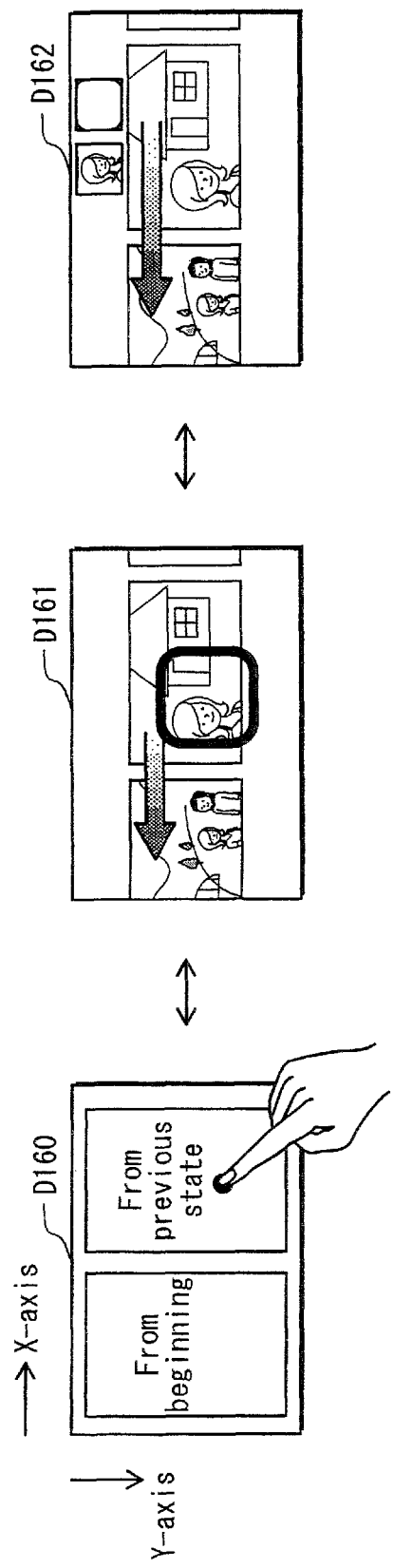
FIG. 23 shows the case of receiving either an instruction for setting a view state to an initial state or an instruction for displaying images in the previous view state.

FIG. 23 shows a screen transition of the aforementioned case. A screen D160 is a menu screen when a user operation is resumed. When the user presses "from previous state" in the screen D160, the third processing element analysis unit judges that an instruction for displaying images in the previous view state has been received.

The third processing element analysis unit reads, from the element information storage unit, the first moving distance, the second moving distance, the position at which the rectangular image was displayed, and the image numbers of images to be displayed. The first processing element analysis unit, the second processing element analysis unit, the UI display information creation unit, and the content display information creation unit each resume display in the previous state, based on the pieces of information read by the third processing element analysis unit. A screen D161 shows display in the full-screen view. A screen D162 shows that pieces of metadata corresponding to the images are displayed together with the images.

By displaying images from the previous view state in the aforementioned manner, the user can easily remember the previous view state.

(17) In Embodiment 6 described above, the information display device displays pieces of metadata corresponding to each image to be displayed. However, it is not limited to such.

(17-1) It is possible to display face images, object images, etc. in order of the frequency of appearance, for images targeted for a scrolling display. In the case of the full-screen view, the images targeted for the scrolling display refer to all images managed by the content information management unit. In the case of the stream view, the images targeted for the scrolling display refer to one or more images that satisfy search conditions from among all images managed by the content information management unit. Here, it is assumed that pieces of metadata corresponding to each image include images of the faces of people, animals, buildings, objects, and the like.

The above structure is realized in the following manner. That is, the content display information creation unit of the information display device counts the number of times of appearance for each category (e.g., people, animals, etc.), with use of pieces of metadata corresponding to each image targeted for a scrolling display. For example, in a case where there are face images of persons A, B, and C, the content display information creation unit counts the number of times the person A has appeared in the one or more images, the number of times the person B has appeared in the one or more images, and the number of times the person C has appeared in the one or more images. Then, as described in Embodiment 6 above, the face images of the persons A, B, and C are displayed in the second display area in descending order of the appearance of frequency. The same applies to animals, buildings, and objects such as umbrellas.

Figure 24C:
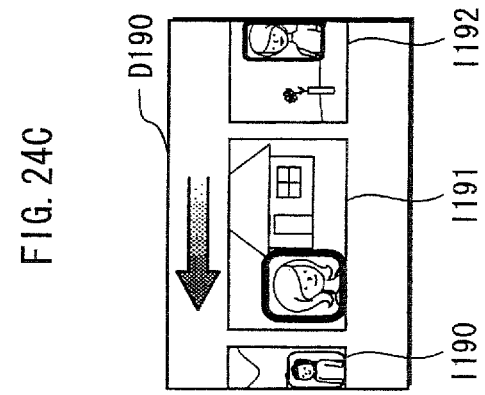
FIGS. 24A, 24B, and 24C each show a modification of a method for displaying metadata.
Figure 24B:
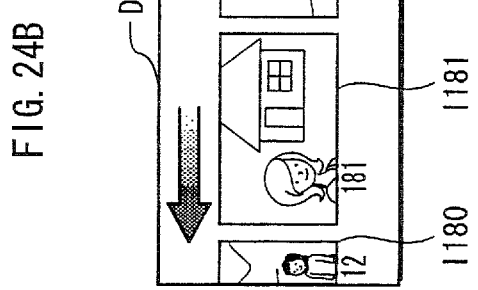
Figure 24A:
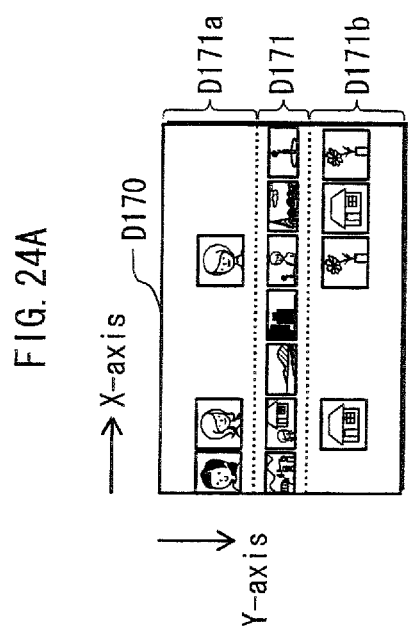

FIG. 24A shows one example of displaying pieces of metadata. A screen D170 is divided into a first display area D171, and second display areas D172a and D172b, in the same manner as Embodiment 6. In the second display area D172a, face images of people are displayed in descending order of the appearance of frequency. In the second display area D172b, object images are displayed in descending order of the appearance of frequency.

(17-2) It is possible to display, for each image targeted for a scrolling display, the number of times faces of people, objects, etc. appear in total in all of the images targeted for the scrolling display. In the case of the full-screen view, the images targeted for the scrolling display refer to all images managed by the content information management unit. In the case of the stream view, the images targeted for the scrolling display refer to one or more images that satisfy search conditions from among all images managed by the content information management unit.

The above structure is realized in the following manner. That is, the content display information creation unit of the information display device counts the number of times of appearance for each category (e.g., people, animals, etc.), with use of pieces of metadata corresponding to each image targeted for a scrolling display.

FIG. 24B shows one example of displaying pieces of metadata. A screen D180 includes images I180 to I182, for each of which the number of times objects identified by pieces of metadata (e.g., faces or buildings) appear in the images is displayed. For example, it can be seen that the person included in the image I180 appears a total of 12 times in the images targeted for the scrolling display.

It is possible to display images with frames enclosing objects identified by pieces of metadata (e.g., faces or buildings), instead of the number of times of appearance.

In this case, the content display information creation unit specifies positions at which objects identified by pieces of metadata are displayed, and outputs the specified positions to the UI display information creation unit.

The UI display information creation unit controls the information display unit to display frames based on the specified positions.

FIG. 24C shows one example of displaying frames. A screen D190 includes images I190 to I192, in each of which objects identified by pieces of metadata are surrounded by frames. For example, it can be seen that, in the image I190, an object identified by a piece of metadata is a person.

(18) In the above embodiments, the initial figure displayed at the start of an operation is circular. However, it is not limited to such.

The initial figure may be any figure as long as it surrounds a position at which pressing has been performed.

The figure displayed during a drag operation does not always need to be rectangular. The figure displayed during a drag operation may be any figure as long as the lengths of the first and second moving distances can be determined from the figure.

(19) Although the UI display information creation unit displays the initial figure and the rectangular image, it is not limited to such.

The UI display information creation unit may display a scrolling speed determined by a drag operation, either a display size or a display line count, motionless duration in which a motionless operation is being performed, and such.

(20) In the above embodiments, the information display device receives instructions pertaining to a scrolling display, i.e., instructions pertaining to a scrolling speed, either a display size or a display line count, etc., via operations using the touch panel. However, it is not limited to such.

The information display device may receive instructions pertaining to a scrolling display via operations using a mouse. This is realized in the following manner. For example, upon receiving, via an operation using the mouse, an instruction for starting an operation pertaining to a scrolling display, the information display device may determine the position of a mouse pointer currently displayed on the screen to be an operation starting position at which the operation pertaining to the scrolling display has been started. When the mouse pointer is moved by a drag operation using the mouse, the information display device may determine the first and second moving distances each starting from the operation starting position.

Alternatively, the information display device may receive instructions pertaining to a scrolling display via a remote controller having a bi-axial or tri-axial acceleration sensor. This is realized in the following manner. For example, upon receiving, via an operation using the remote controller, an instruction for starting an operation pertaining to a scrolling display, the information display device may determine the position of a pointer currently displayed on the screen to be an operation starting position at which the operation pertaining to the scrolling display has been started. When the remote controller is moved up or down, and right or left, the information display device may determine the first and second moving distances each starting from the operation starting position.

(21) Methods described in the aforementioned embodiments and modifications may be realized as follows. First, programs that describe procedures of the methods may be stored in a memory. Then, a CPU (Central Processing Unit) or the like may read the programs from the memory, and execute the programs.

(22) The programs that describe procedures of the methods in the aforementioned embodiments and modifications may be stored on recording media and distributed via the recording media.

(23) Each of the blocks included in the respective devices described in the aforementioned embodiments and modifications is typically realized by an LSI that is an integrated circuit. Each block may be made into one chip individually, or may also be made into one chip so as to include part or all of the blocks. Note that the LSI may be referred to as an IC, a system LSI, a super LSI or an ultra LSI, depending on the degree of integration.

Furthermore, a method for the integration is not limited to an LSI, but may be realized with a dedicated circuit or a general-purpose processor. Alternatively, the integration may be realized with use of an FPGA (field programmable gate array) that is programmable after manufacturing the LSI, or a reconfigurable processor that enables reconfiguration of the connection and settings of circuit cells in the LSI. Furthermore, if a technology of integration that substitutes for the LSI appears by a progress of semiconductor technology or another derivational technology, it is possible to integrate the function blocks by using the technology. A possible field for integrating the function blocks can be an adaptation of biotechnology.

(24) The present invention may be any combination of the above embodiments and modifications.

INDUSTRIAL APPLICABILITY

An information display device according to the present invention has an operational structure that uses a plurality of operational axes pertaining to the scrolling states of contents. In this structure, the actions of a user are allocated to the respective operational axes to enable the user to perform intuitive operations for controlling the scrolling states along the operational axes. The information display device performs processing for controlling the scrolling states along the operational axes, thereby enabling the user to perform operations for scrolling through the contents easily and intuitively, as compared to conventional key operations. The information display device has an information display function for, when the user performs an operation pertaining to pictures, displaying the pictures by scrolling through the pictures while reflecting an intention of the user. This enables the user to review the pictures, search the pictures, and grasp the contents of the pictures with easy and intuitive operations. For this reason, the information display device is useful, for example, as a mobile viewing terminal or the like. Also, the information display device is applicable to a DVD recorder, a TV, a computer software, and the like.

REFERENCE SIGNS LIST 1 user operation judgment unit
2 element information storage unit
3 first processing element analysis unit
4 second processing element analysis unit
5 third processing element analysis unit
6 first processing unit
7 second processing unit
8 content information management unit
9 content display information creation unit
10 UI display information creation unit
11 information display unit
12 coordinate detection unit
20 display 21 resistive coordinate detection device
22 protection insulation layer
100 information display device
101 touch panel display

The invention claimed is:

1. An information display device comprising:
a reception unit operable to extract, from a motion vector obtained by a move operation by a user on a two-dimensional plane defined by first and second axes, a motion component along the first axis and a motion component along the second axis, and to receive an instruction for displaying a plurality of contents according to the extracted motion components;
a determination unit operable to determine a moving speed for moving the contents, based on the motion component along the first axis, and to determine a display mode for displaying the contents, based on the motion component along the second axis; and
a display unit operable to display the contents in the determined display mode on a screen, by scrolling through the contents at the determined moving speed,
wherein the screen has a touch panel function,
wherein the move operation is an operation performed by the user sliding a finger on the screen,
wherein the reception unit is further operable to specify a starting position on the screen which the finger touches at a start of the move operation, and to specify the motion components along the first and the second axes by the move operation,
wherein the display unit is further operable to display a predetermined initial figure at the starting position, and subsequently display a figure corresponding to the motion components along the first and the second axes after changing the predetermined initial figure to the corresponding figure,
wherein the reception unit is further operable, after the sliding of the finger is performed on the screen, to receive a pressing operation in which pressing of the finger is continuous at an ending position of the sliding,
wherein the determination unit is further operable to judge whether or not to maintain the determined moving speed and the determined display mode, based on the pressing operation,
wherein the display unit is further operable to stop displaying the contents in the display mode by scrolling through the contents at the moving speed, when the determination unit judges that the moving speed and the display mode are not to be maintained,
wherein the determination unit judges that the moving speed and the display mode are to be maintained when judging that a pressing time period at the ending position of the sliding has exceeded a predetermined time period, and judges that the moving speed and the display mode are not to be maintained when judging that the pressing time period has not exceeded the predetermined time period,
wherein the determination unit is further operable to measure a time in which the pressing operation at the ending position is being performed, and
wherein the display unit is further operable, while the reception unit is receiving the pressing operation, to display at least one of the time that is being measured and a message indicating whether to maintain the determined moving speed and the determined display mode.

2. The information display device of claim 1, wherein
the determination unit determines the moving speed such that the larger the motion component in a given direction along the first axis is, the faster the moving speed for scrolling through the contents is, and
the display unit displays the contents by scrolling through the contents in a direction opposite from the given direction at the moving speed.

3. The information display device of claim 2, wherein
the contents are images,
the display mode indicates a display size of the images, and
the determination unit determines the display size such that the larger the motion component in a given direction along the second axis is, the smaller the display size is.

4. The information display device of claim 2, wherein
the contents are images,
the display mode indicates a number of lines of the images to be displayed in a direction orthogonal to a direction for scrolling through the images, and
the determination unit determines the number of lines such that the larger a motion component in a given direction along the second axis is, the larger the number of lines is.

5. The information display device of claim 1, wherein the display unit displays the predetermined initial figure after changing the corresponding figure back to the predetermined initial figure, when the determination unit judges that the pressing time period has not exceeded the predetermined time period.

6. The information display device of claim 1, wherein the display unit is further operable, in a case where a next move operation is performed from a position of the screen that is currently touched by the finger, to display (i) information indicating that the moving speed has been changed in accordance with a direction of the finger sliding along the first axis and (ii) information indicating that the display mode has been changed in accordance with a direction of the finger sliding along the second axis.

7. The information display device of claim 1, wherein
the screen is divided into first and second display areas,
the information display device further comprises an acquisition unit operable to acquire display information sets pertaining to a display of the contents, and
the display unit displays the contents in the first display area, and displays the display information sets in the second display area.

8. The information display device of claim 7, wherein
the display information sets are metadata sets, each of the metadata sets corresponding to and identifying a different one of the contents, and
the display unit displays, in the second display area, one or more metadata sets corresponding to one or more contents that are being displayed in the first display area.

9. The information display device of claim 8, wherein
the contents are pictures, and
each of the metadata sets indicates at least one of (i) a face of a person included in a corresponding picture and (ii) a color shade of a whole or part of the corresponding picture.

10. The information display device of claim 7, wherein the display information indicates at least one of the determined moving speed and the determined display mode.

11. A display method used in an information display device, comprising:
a reception step of extracting, from a motion vector obtained by a move operation by a user on a two-dimensional plane defined by first and second axes, a motion component along the first axis and a motion component along the second axis, and of receiving an instruction for displaying a plurality of contents according to the extracted motion components;

a determination step of determining a moving speed for moving the contents, based on the motion component along the first axis, and of determining a display mode for displaying the contents, based on the motion component along the second axis; and a display step of displaying the contents in the determined display mode on a screen, by scrolling through the contents at the determined moving speed, wherein the screen has a touch panel function, wherein the move operation is an operation performed by the user sliding a finger on the screen, wherein the reception step further specifies a starting position on the screen which the finger touches at a start of the move operation, and specifies the motion components along the first and the second axes by the move operation, wherein the display step further displays a predetermined initial figure at the starting position, and subsequently displays a figure corresponding to the motion components along the first and the second axes after changing the predetermined initial figure to the corresponding figure, wherein, after the sliding of the finger is performed on the screen, the reception step further receives a pressing operation in which pressing of the finger is continuous at an ending position of the sliding, wherein the determination step further judges whether or not to maintain the determined moving speed and the determined display mode, based on the pressing operation, wherein the display step further stops displaying the contents in the display mode by scrolling through the contents at the moving speed, when the determination step judges that the moving speed and the display mode are not to be maintained, wherein the determination step judges that the moving speed and the display mode are to be maintained when judging that a pressing time period at the ending position of the sliding has exceeded a predetermined time period, and judges that the moving speed and the display mode are not to be maintained when judging that the pressing time period has not exceeded the predetermined time period, wherein the determination step further measures a time in which the pressing operation at the ending position is being performed, and wherein, while the reception step is receiving the pressing operation, the display step further displays at least one of the time that is being measured and a message indicating whether to maintain the determined moving speed and the determined display mode.

12. A non-transitory computer-readable recording medium having a computer program recorded thereon, the computer program causing an information display device to execute a method comprising:

a reception step of extracting, from a motion vector obtained by a move operation by a user on a two-dimensional plane defined by first and second axes, a motion component along the first axis and a motion component along the second axis, and of receiving an instruction for displaying a plurality of contents according to the extracted motion components;

a determination step of determining a moving speed for moving the contents, based on the motion component along the first axis, and of determining a display mode for displaying the contents, based on the motion component along the second axis; and a display step of displaying the contents in the determined display mode on a screen, by scrolling through the contents at the determined moving speed, wherein the screen has a touch panel function, wherein the move operation is an operation performed by the user sliding a finger on the screen, wherein the reception step further specifies a starting position on the screen which the finger touches at a start of the move operation, and specifies the motion components along the first and the second axes by the move operation, wherein the display step further displays a predetermined initial figure at the starting position, and subsequently displays a figure corresponding to the motion components along the first and the second axes after changing the predetermined initial figure to the corresponding figure, wherein, after the sliding of the finger is performed on the screen, the reception step further receives a pressing operation in which pressing of the finger is continuous at an ending position of the sliding, wherein the determination step further judges whether or not to maintain the determined moving speed and the determined display mode, based on the pressing operation, wherein the display step further stops displaying the contents in the display mode by scrolling through the contents at the moving speed, when the determination step judges that the moving speed and the display mode are not to be maintained, wherein the determination step judges that the moving speed and the display mode are to be maintained when judging that a pressing time period at the ending position of the sliding has exceeded a predetermined time period, and judges that the moving speed and the display mode are not to be maintained when judging that the pressing time period has not exceeded the predetermined time period, wherein the determination step further measures a time in which the pressing operation at the ending position is being performed, and wherein, while the reception step is receiving the pressing operation, the display step further displays at least one of the time that is being measured and a message indicating whether to maintain the determined moving speed and the determined display mode.

13. An integrated circuit used in an information display device, comprising:

a reception unit operable to extract, from a motion vector obtained by a move operation by a user on a two-dimensional plane defined by first and second axes, a motion component along the first axis and a motion component along the second axis, and to receive an instruction for displaying a plurality of contents according to the extracted motion components;

a determination unit operable to determine a moving speed for moving the contents, based on the motion component along the first axis, and to determine a display mode for displaying the contents, based on the motion component along the second axis; and a display unit operable to display the contents in the determined display mode on a screen, by scrolling through the contents at the determined moving speed, wherein the screen has a touch panel function, wherein the move operation is an operation performed by the user sliding a finger on the screen, wherein the reception unit is further operable to specify a starting position on the screen which the finger touches at a start of the move operation, and to specify the motion components along the first and the second axes by the move operation, wherein the display unit is further operable to display a predetermined initial figure at the starting position, and subsequently display a figure corresponding to the motion components along the first and the second axes after changing the predetermined initial figure to the corresponding figure, wherein the reception unit is further operable, after the sliding of the finger is performed on the screen, to receive a pressing operation in which pressing of the finger is continuous at an ending position of the sliding, wherein the determination unit is further operable to judge whether or not to maintain the determined moving speed and the determined display mode, based on the pressing operation, wherein the display unit is further operable to stop displaying the contents in the display mode by scrolling through the contents at the moving speed, when the determination unit judges that the moving speed and the display mode are not to be maintained, wherein the determination unit judges that the moving speed and the display mode are to be maintained when judging that a pressing time period at the ending position of the sliding has exceeded a predetermined time period, and judges that the moving speed and the display mode are not to be maintained when judging that the pressing time period has not exceeded the predetermined time period, wherein the determination unit is further operable to measure a time in which the pressing operation at the ending position is being performed, and wherein the display unit is further operable, while the reception unit is receiving the pressing operation, to display at least one of the time that is being measured and a message indicating whether to maintain the determined moving speed and the determined display mode.

* * * * *